(12) United States Patent
Honda et al.

(10) Patent No.: US 12,222,598 B2
(45) Date of Patent: Feb. 11, 2025

(54) LIQUID CRYSTAL DISPLAY DEVICE

(71) Applicant: Shanghai Tianma Micro-Electronics Co., Ltd., Shanghai (CN)

(72) Inventors: Tomomi Honda, Kanagawa (JP); Mitsuhiro Sugimoto, Kanagawa (JP); Hidenori Ikeno, Kanagawa (JP); Takayuki Konno, Kanagawa (JP); Shinya Onda, Kanagawa (JP); Satoshi Inada, Kanagawa (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/750,437

(22) Filed: Jun. 21, 2024

(65) Prior Publication Data

US 2025/0004318 A1    Jan. 2, 2025

(30) Foreign Application Priority Data

Jun. 30, 2023    (JP) .................................. 2023-108033

(51) Int. Cl.
*G02F 1/1335*    (2006.01)
*G02F 1/1333*    (2006.01)
*G02F 1/13357*    (2006.01)

(52) U.S. Cl.
CPC .. *G02F 1/133512* (2013.01); *G02F 1/133368* (2021.01); *G02F 1/133603* (2013.01); *G02F 1/133612* (2021.01)

(58) Field of Classification Search
None
See application file for complete search history.

(56) References Cited

U.S. PATENT DOCUMENTS

| 2020/0264463 | A1 | 8/2020 | Chen et al. |
| 2020/0292894 | A1 | 9/2020 | Liu et al. |
| 2021/0200044 | A1* | 7/2021 | Sasaki ................. G02F 1/13471 |
| 2022/0397800 | A1* | 12/2022 | Sun ....................... G02F 1/1368 |

FOREIGN PATENT DOCUMENTS

JP    2021-535415 A    12/2021

* cited by examiner

*Primary Examiner* — Phu Vu
(74) *Attorney, Agent, or Firm* — Sughrue Mion, PLLC

(57) ABSTRACT

A liquid crystal display device includes a first liquid crystal display panel in which a first main pixel including subpixels is arranged in a matrix, and that displays a color image, and a second liquid crystal display panel that includes a second main pixel corresponding to a plurality of the first main pixel, and that displays a monochrome image. The second main pixel is divided into a plurality of regions, and has pixel electrodes disposed in the plurality of regions and a plurality of light shields. At least a portion of the plurality of light shields is formed from a switching element that connects to each of the pixel electrodes, and the plurality of light shields is arranged in a staggered manner. The light shields positioned within one set of the regions formed from adjacent regions forms one set of the light shields.

6 Claims, 30 Drawing Sheets

LIQUID CRYSTAL DISPLAY DEVICE

CROSS-REFERENCE TO RELATED APPLICATIONS

This application claims the benefit of Japanese Patent Application No. 2023-108033, filed on Jun. 30, 2023, the entire disclosure of which is incorporated by reference herein.

FIELD OF THE INVENTION

This application relates generally to a liquid crystal display device.

BACKGROUND OF THE INVENTION

In the related art, liquid crystal display devices are known in which contrast is enhanced by stacking a plurality of liquid crystal panels. For example, Unexamined Japanese Patent Application Publication No. 2021-535415 describes a display panel including an optical control panel and a display liquid crystal panel that are stacked.

In Unexamined Japanese Patent Application Publication No. 2021-535415, the display liquid crystal panel realizes a display function, and the optical control panel controls the light that is incident on the display liquid crystal panel from a back light. The optical control panel includes a plurality of signal lines (gate lines and data lines). At least a portion of the plurality of signal lines are fold lines. In Unexamined Japanese Patent Application Publication No. 2021-535415, the moire of the display panel is improved by configuring the signal lines of the optical control panel as fold lines, and forming the signal lines of the optical control panel and grid lines (gate lines and data lines) of the display liquid crystal panel in different patterns.

In Unexamined Japanese Patent Application Publication No. 2021-535415, the signal lines of the optical control panel are folded at a predetermined period. Accordingly, the thin film transistors that drive the optical control unit of the optical control panel periodically block the light incident on the subpixel units of a specific color of the display liquid crystal panel and, consequently, the brightness of the subpixel units of the specific color may periodically decline. When the brightness of subpixel units of a specific color periodically declines, color moire occurs in the display panel.

SUMMARY OF THE INVENTION

A liquid crystal display device according to a first aspect of the present disclosure includes:
- a first liquid crystal display panel in which a first main pixel including a plurality of subpixels of different colors is arranged in a matrix in a predetermined first direction and a predetermined second direction perpendicular to the predetermined first direction, the first liquid crystal display panel displaying a color image; and
- a second liquid crystal display panel that is positioned on a side, opposite a surface of an observer side, of the first liquid crystal display panel and overlaid on the first liquid crystal display panel, includes a second main pixel corresponding to a plurality of the first main pixel, the second liquid crystal display panel displaying a monochrome image, wherein
- the second main pixel is divided into a plurality of regions, and has pixel electrodes disposed in the plurality of regions and a plurality of light shields,
- at least a portion of the plurality of light shields is formed from a switching element that connects to each of the pixel electrodes,
- the plurality of light shields is arranged in a staggered manner,
- the light shields positioned within one set of the regions, formed from the regions adjacent to each other, forms one set of the light shields, and
- the one set of light shields equally blocks, for each color, light incident on the subpixels.

It is to be understood that both the foregoing general description and the following detailed description are exemplary and explanatory and are not restrictive of this disclosure.

BRIEF DESCRIPTION OF DRAWINGS

A more complete understanding of this application can be obtained when the following detailed description is considered in conjunction with the following drawings, in which.

DETAILED DESCRIPTION OF THE INVENTION

Hereinafter, a liquid crystal display device according to various embodiments is described while referencing the drawings.

Embodiment 1

A liquid crystal display device 10 according to the present embodiment is described while referencing FIGS. 1 to 21.

The liquid crystal display device 10 displays color images using a first liquid crystal display panel 100 and a second liquid crystal display panel 200, described later.

Figure 1:
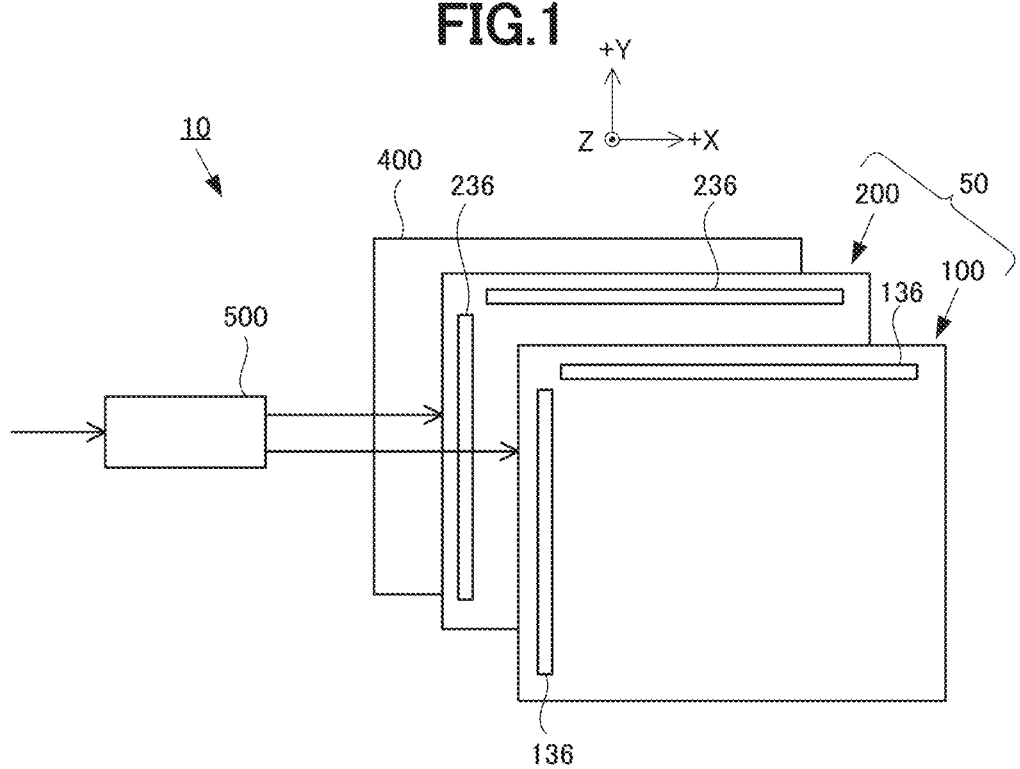
FIG. 1 is a schematic drawing illustrating a liquid crystal display device according to Embodiment 1.

As illustrated in FIG. 1, the liquid crystal display device 10 includes a panel 50, a back light 400, and a display controller 500. The panel 50 includes a first liquid crystal display panel 100 and a second liquid crystal display panel 200. The back light 400 is a light source that emits light on the first liquid crystal display panel 100 and the second liquid crystal display panel 200. The display controller 500 controls the displaying of the first liquid crystal display panel 100 and the second liquid crystal display panel 200. Note that, in the present description, to facilitate comprehension, in the liquid crystal display device 10 of FIG. 1, the right direction (the right direction on paper) is referred to as the "+X direction", the up direction (the up direction on paper) is referred to as the "+Y direction", and the direction perpendicular to the +X direction and the +Y direction (the front direction on paper) is referred to as the "+Z direction."

Panel

The panel 50 includes the first liquid crystal display panel 100 and the second liquid crystal display panel 200. The first liquid crystal display panel 100 is positioned on the observer side (the +Z side), and displays color images. The second liquid crystal display panel 200 is positioned on a side, opposite the surface of the observer side, of the first liquid crystal display panel 100 (back surface side of the first liquid crystal display panel 100), and is overlaid on the first liquid crystal display panel 100. The second liquid crystal display panel 200 displays monochrome images.

First Liquid Crystal Display Panel

In one example, the first liquid crystal display panel 100 is implemented as a known transmission type transverse electric field liquid crystal display panel. The first liquid crystal display panel 100 is active matrix driven by thin film transistors (TFT).

Figure 2:
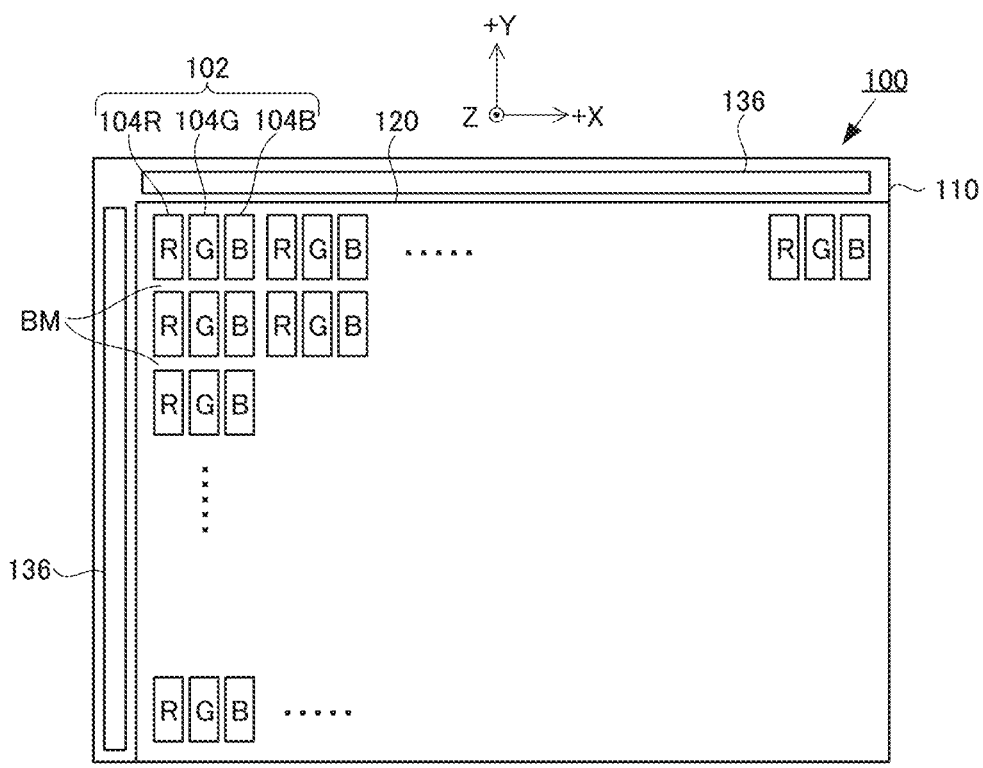
FIG. 2 is a plan view illustrating a first liquid crystal display panel according to Embodiment 1.

As illustrated in FIG. 2, the first liquid crystal display panel 100 includes a first main pixel 102 arranged in a matrix. Each first main pixel 102 is formed from a red subpixel 104R that emits red light, a green subpixel 104G that emits green light, and a blue subpixel 104B that emits blue light. The red subpixel 104R, the green subpixel 104G, and the blue subpixel 104B each have a rectangular shape and are arranged in order in the X direction. Note that the red subpixel 104R, the green subpixel 104G, and the blue subpixel 104B are referred to collectively as "subpixels 104."

Figure 3:
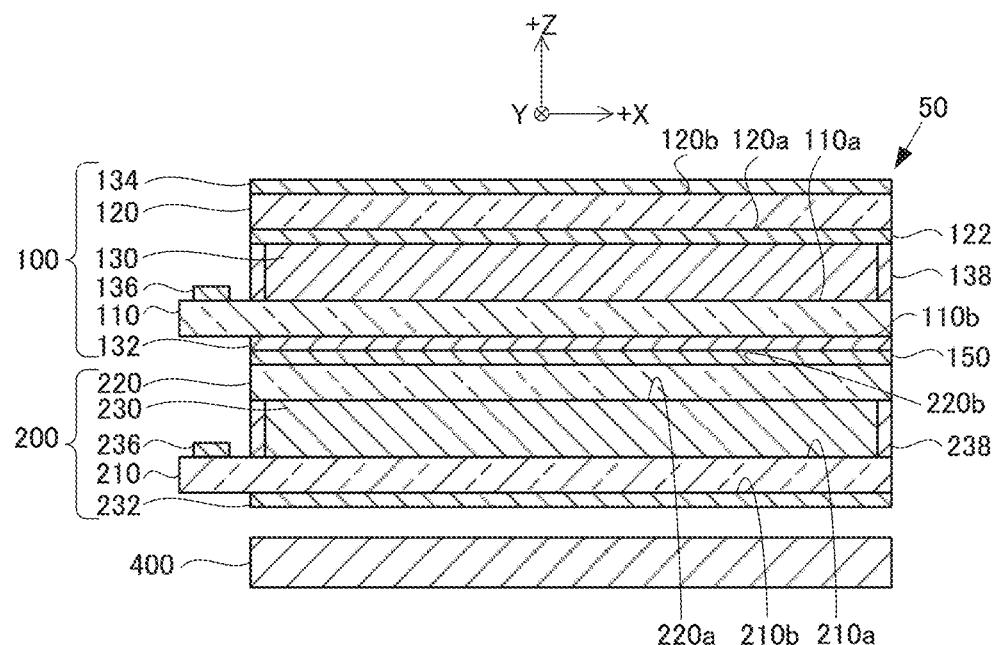
FIG. 3 is a cross-sectional view illustrating a panel and a back light according to Embodiment 1.

As illustrated in FIG. 3, the first liquid crystal display panel 100 includes a first TFT substrate 110, a first counter substrate 120, a first liquid crystal 130, a first polarizing plate 132, a second polarizing plate 134, and a first driver circuit 136. The first TFT substrate 110 and the first counter substrate 120 sandwich the first liquid crystal 130. The first polarizing plate 132 is provided on the first TFT substrate 110. The second polarizing plate 134 is provided on the first counter substrate 120.

In one example, the first TFT substrate 110 is implemented as a glass substrate. TFTs, common electrodes, pixel electrodes, an alignment film, and the like (all not illustrated in the drawings) are provided on a main surface 110a on the first liquid crystal 130 side of the first TFT substrate 110. The TFTs of the first TFT substrate 110 are provided for the purpose of selecting the subpixels 104. The alignment film of the first TFT substrate 110 aligns the first liquid crystal 130.

Furthermore, a plurality of common wires, a plurality of scanning wires, and a plurality of signal wires (all not illustrated in the drawings) are formed on the main surface 110*a* of the first TFT substrate 110. The common wires supply common voltage to the common electrodes that apply voltage to the first liquid crystal 130. The scanning wires supply voltage that causes the TFTs to operate. The scanning wires extend in the X direction. The signal wires supply, via the TFTs, voltage to the pixel electrodes that apply voltage to the first liquid crystal 130. The signal wires extend in the Y direction. The subpixels 104 are surrounded by the signal wires and the scanning wires, and the TFTs are provided at intersections between the scanning wires and the signal wires. The first polarizing plate 132 is provided on a main surface 110*b*, on the side opposite the main surface 110*a*, of the first TFT substrate 110.

As illustrated in FIG. 3, the first counter substrate 120 opposes the first TFT substrate 110. The first counter substrate 120 is affixed to the first TFT substrate 110 by a sealing material 138. In one example, the first counter substrate 120 is implemented as a glass substrate. A color filter 122, a black matrix BM, an alignment film, and the like are provided on a main surface 120*a* on the first liquid crystal 130 side of the first counter substrate 120.

In one example, the color filter 122 is implemented as a striped color filter in which color filters of the same color are arranged in the Y direction (color filter in which the stripe direction is the Y direction). Each of a red color filter, a green color filter, and a blue color filter of the color filter 122 is surrounded by the black matrix BM, and corresponds to each of the red subpixel 104R, the green subpixel 104G, and the blue subpixel 104B. As illustrated in FIG. 2, the black matrix BM defines each first main pixel 102 and each subpixel 104. The alignment film aligns the first liquid crystal 130. The second polarizing plate 134 is provided on a main surface 120*b*, on the side opposite the main surface 120*a*, of the first counter substrate 120. Note that, to facilitate comprehension, the black matrix BM, the alignment film, and the like are omitted from FIG. 3.

As illustrated in FIG. 3, the first liquid crystal 130 is sandwiched between the first TFT substrate 110 and the first counter substrate 120. In one example, the first liquid crystal 130 is implemented as a positive-type nematic liquid crystal. The first liquid crystal 130 is aligned, by the alignment film, in a direction parallel to the main surface 110*a* of the first TFT substrate 110. Additionally, the first liquid crystal 130 rotates, as a result of voltage being applied, in a plane parallel to the main surface 110*a* of the first TFT substrate 110.

The first polarizing plate 132 is provided on the main surface 110*b* of the first TFT substrate 110. The second polarizing plate 134 is provided on the main surface 120*b* of the first counter substrate 120. One transmission axis of the transmission axis of the first polarizing plate 132 and the transmission axis of the second polarizing plate 134 is arranged parallel to the alignment direction of the first liquid crystal 130. Additionally, the transmission axis of the first polarizing plate 132 and the transmission axis of the second polarizing plate 134 are orthogonal to each other. The first polarizing plate 132 is affixed, by a light-transmitting adhesive layer 150, to a second counter substrate 220 of the second liquid crystal display panel 200, described later. In one example, the adhesive layer 150 is implemented as an optical clear adhesive (OCA).

The first driver circuit 136 is provided on the main surface 110*a* of the first TFT substrate 110. The first driver circuit 136 supplies voltage to the scanning wires, the signal wires, and the common wires on the basis of a color image signal supplied from the display controller 500.

Second Liquid Crystal Display Panel

As illustrated in FIG. 3, the second liquid crystal display panel 200 is positioned on the back side (the −Z side) of the first liquid crystal display panel 100. The second liquid crystal display panel 200 is affixed to the first liquid crystal display panel 100 by the adhesive layer 150. The second liquid crystal display panel 200 displays monochrome images.

Figure 4:
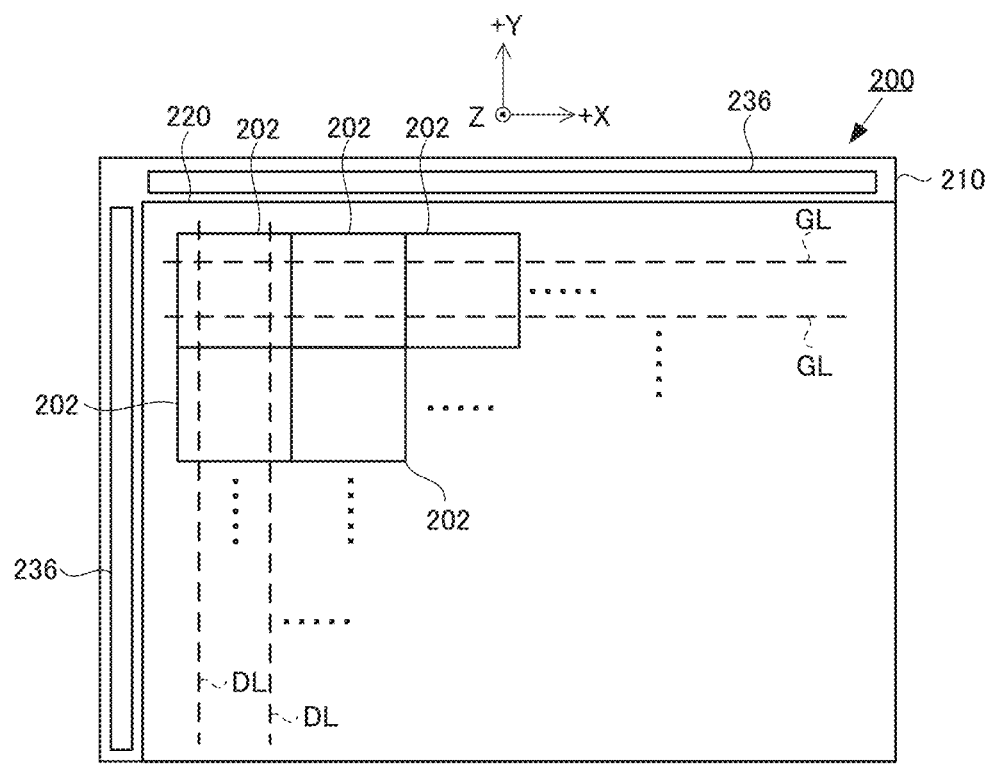
FIG. 4 is a plan view illustrating a second liquid crystal display panel according to Embodiment 1.

In the present embodiment, the second liquid crystal display panel 200 is implemented as a transmission type transverse electric field liquid crystal display panel that uses a positive-type liquid crystal. The second liquid crystal display panel 200 is active matrix driven by switching elements 240, described later. As illustrated in FIG. 4, the second liquid crystal display panel 200 includes a second main pixel 202 arranged in a matrix. In the present embodiment, one second main pixel 202 of the second liquid crystal display panel 200 corresponds to 16 (4×4: four in the X direction and four in the Y direction) of the first main pixels 102 of the first liquid crystal display panel 100. Specifically, one second main pixel 202 of the second liquid crystal display panel 200 transmits light from the backlight 400 towards 16 first main pixels 102 of the first liquid crystal display panel 100. Note that, the scanning wires GL and the signal wires DL are illustrated as dashed lines in FIG. 4. In the following drawings, the scanning wires GL and the signal wires DL may be illustrated as dashed lines or solid lines.

As illustrated in FIG. 3, the second liquid crystal display panel 200 includes a second TFT substrate 210, a second counter substrate 220, a second liquid crystal 230, a third polarizing plate 232, and a second driver circuit 236. The second TFT substrate 210 and the second counter substrate 220 sandwich the second liquid crystal 230. The third polarizing plate 232 is provided on the second TFT substrate 210. Note that, in the present embodiment, the first polarizing plate 132 of the first liquid crystal display panel 100 also serves as a polarizing plate on the light exit side of the second liquid crystal display panel 200. The second liquid crystal display panel 200 is not provided with a color filter and a black matrix.

In one example, the second TFT substrate 210 is implemented as a glass substrate. Common wires (not illustrated), a plurality of scanning wires GL, a plurality of signal wires DL, an alignment film (not illustrated), and switching elements 240, pixel electrodes 250, common electrodes CE and light shields 300 of the second main pixel 202, and the like are formed on the main surface 210*a* of the second liquid crystal 230 side of the second TFT substrate 210. The common wires supply common voltage to the common electrodes CE that apply voltage to the second liquid crystal 230. The scanning wires GL supplies voltage that causes the switching elements 240 to operate. The signal wires DL supply, via the switching elements 240, voltage to the pixel electrodes 250 that apply voltage to the second liquid crystal 230. The alignment film aligns the second liquid crystal 230. The third polarizing plate 232 is provided on the main surface 210*b*, on the side opposite the main surface 210*a*, of the second TFT substrate 210.

In the present embodiment, the light shields 300 of the second main pixels 202 are formed from the switching elements 240. Configurations of the second main pixel 202, the scanning wires GL, the signal wires DL, and the like are described later.

The second counter substrate 220 opposes the second TFT substrate 210. The second counter substrate 220 is affixed to the second TFT substrate 210 by a sealing material 238. In one example, the second counter substrate 220 is implemented as a glass substrate. An alignment film (not illustrated) that aligns the second liquid crystal 230 is provided on a main surface 220a on the second liquid crystal 230 side of the second counter substrate 220. The adhesive layer 150 is provided on a main surface 220b, on the side opposite the main surface 220a, of the second counter substrate 220. The second counter substrate 220 is affixed to the first liquid crystal display panel 100 (the first polarizing plate 132) via the adhesive layer 150.

The second liquid crystal 230 is sandwiched between the second TFT substrate 210 and the second counter substrate 220. The second liquid crystal 230 is implemented as a positive-type nematic liquid crystal. The second liquid crystal 230 is initially aligned in the Y direction by the alignment film. The second liquid crystal 230 rotates, due to voltage being applied, in a plane parallel to the main surface 210a of the second TFT substrate 210.

The third polarizing plate 232 is provided on the main surface 210b of the second TFT substrate 210. The transmission axis of the third polarizing plate 232 is disposed parallel to the alignment direction of the second liquid crystal 230. The transmission axis of the third polarizing plate 232 and the transmission axis of the first polarizing plate 132 of the first liquid crystal display panel 100 (the polarizing plate on the light exit side of the second liquid crystal display panel 200) are orthogonal to each other, and the second liquid crystal display panel 200 operates in a normally black mode.

The second driver circuit 236 is provided on the main surface 210a of the second TFT substrate 210. The second driver circuit 236 supplies voltage to the scanning wires GL, the signal wires DL, and the common wires on the basis of a signal supplied from the display controller 500.

Figure 5:
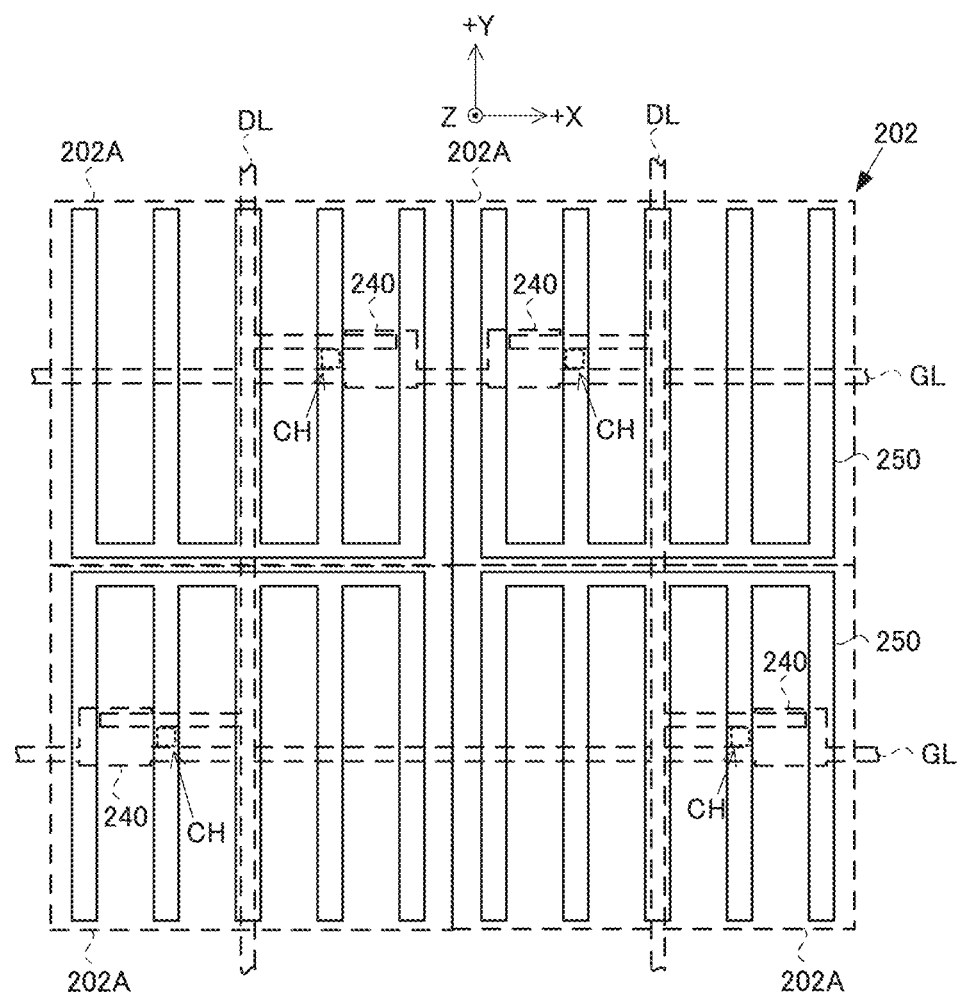
FIG. 5 is a plan view illustrating a second main pixel according to Embodiment 1.
Figure 6:
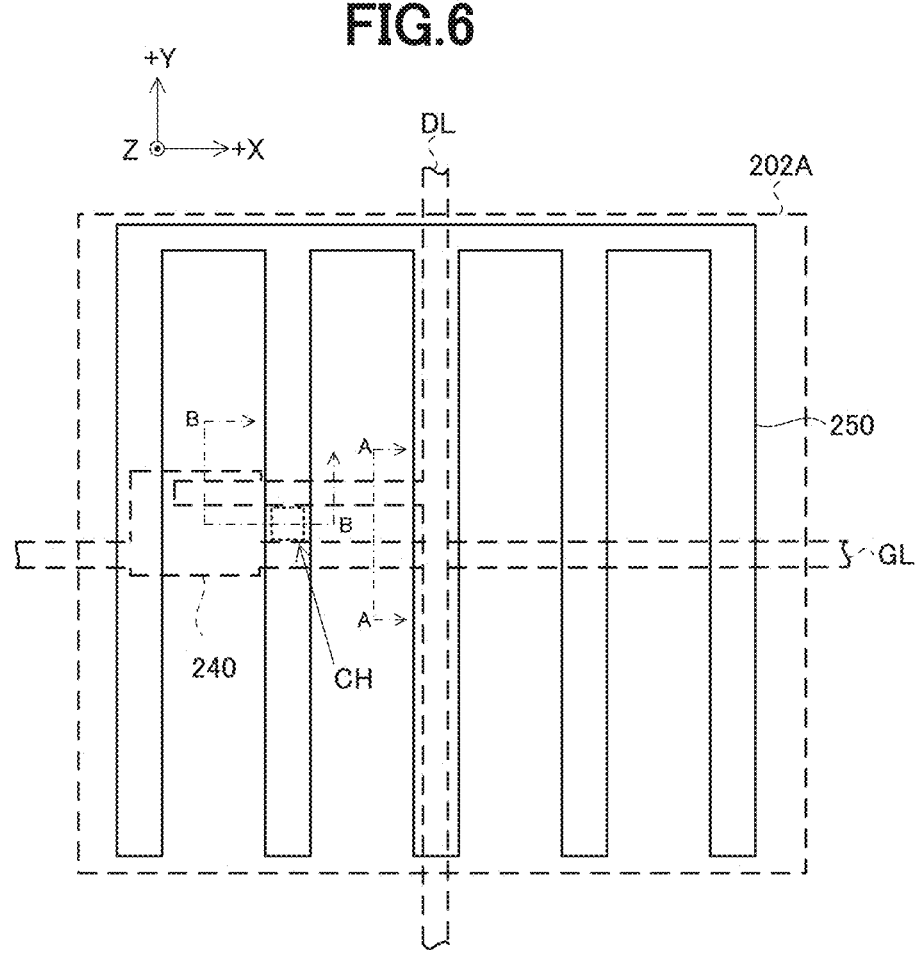
FIG. 6 is a plan view illustrating regions of the second main pixel according to Embodiment 1.
Figure 7:
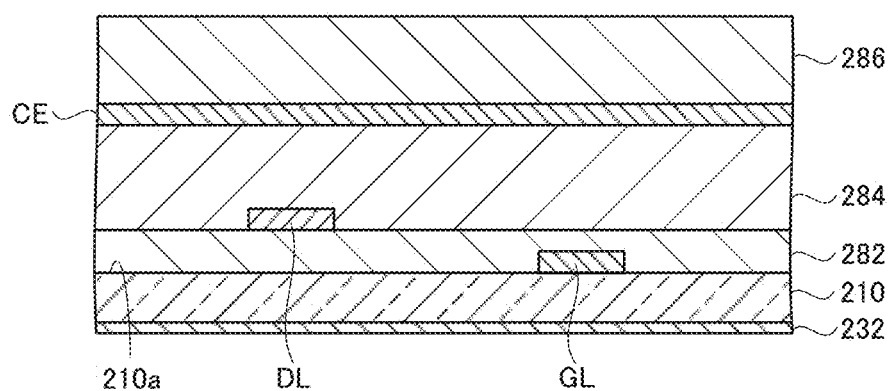
FIG. 7 is a cross-sectional view of a scanning wire and a signal wire illustrated in FIG. 6, taken along line A-A.
Figure 8:
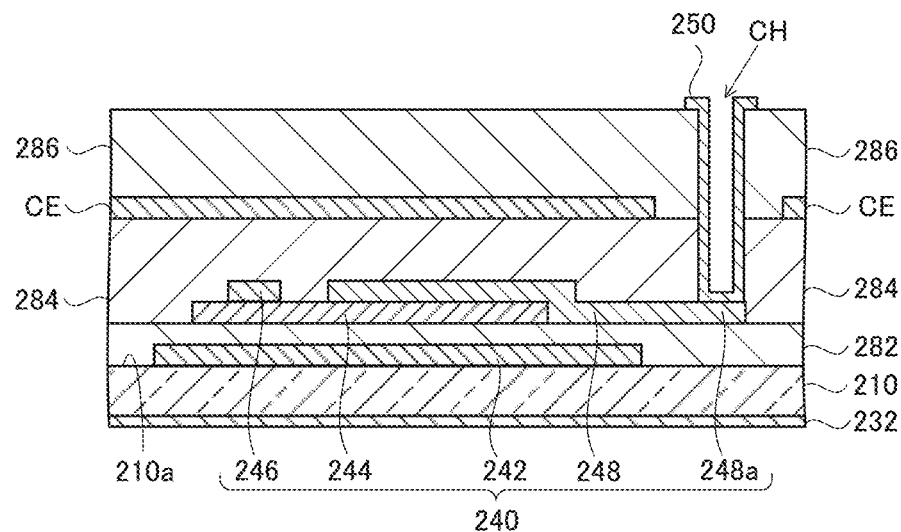
FIG. 8 is a cross-sectional view of a switching element and a contact hole illustrated in FIG. 6, taken along line B-B.
Figure 9:
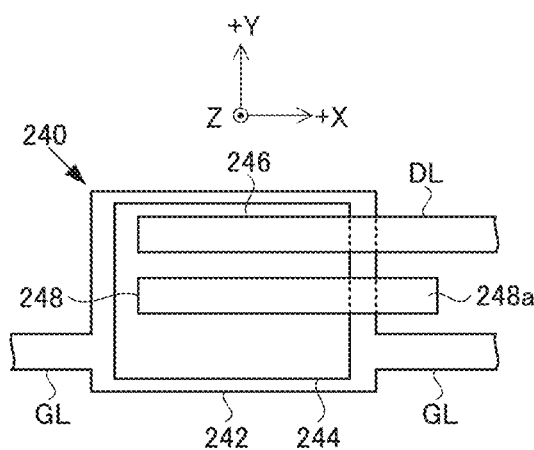
FIG. 9 is a plan view illustrating the switching element according to Embodiment 1.
Figure 10:
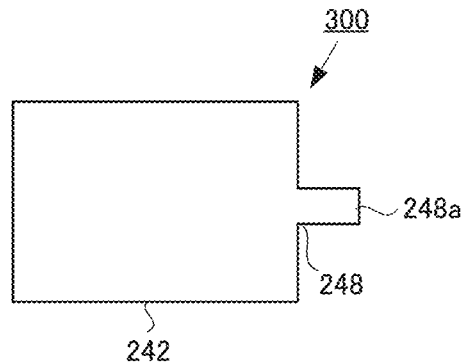
FIG. 10 is a plan view illustrating an external shape of a light shield according to Embodiment 1.

The configurations of the scanning wires GL, the signal wires DL, and the second main pixel 202 are described while referencing FIGS. 4 to 8. FIG. 5 is a plan view illustrating the second main pixel 202. FIG. 6 is a plan view illustrating a region 202A of the second main pixel 202. FIG. 7 is a cross-sectional view of the scanning wire GL and the signal wire DL illustrated in FIG. 6, taken along line A-A. FIG. 8 is a cross-sectional view of a switching element 240 and a contact hole CH illustrated in FIG. 6, taken along line B-B. FIG. 9 is a plan view illustrating the switching element 240. To facilitate comprehension, a first insulation layer 282, a second insulation layer 284, and the like are omitted from FIGS. 5, 6, and 9.

As illustrated in FIG. 4, the second main pixel 202 has a rectangular shape. As illustrated in FIG. 5, the second main pixel 202 is divided into four regions 202A, in two rows and two columns in the X direction and the Y direction. As illustrated in FIGS. 5 and 6, a switching element 240 and a pixel electrode 250 are disposed in each region 202A. One second main pixel 202 (four pixel electrodes 250) is driven by voltage (signals) from a pair of adjacent scanning wires GL and a pair of adjacent signal wires DL. That is, identical gate signals and identical data signals are simultaneously input into each of the four switching elements 240. Note that, the pair of adjacent scanning wires GL may be implemented as two scanning wires GL that branch from one scanning wire. The pair of adjacent signal wires DL may be implemented as two signal wires DL that branch from one signal wire.

As illustrated in FIGS. 4 to 6, the scanning wires GL extend linearly in the X direction. As illustrated in FIG. 7, the scanning wires GL are formed on the main surface 210a of the second TFT substrate 210, and are covered by a first insulation layer 282.

As illustrated in FIGS. 4 to 6, the signal wires DL extend linearly in the Y direction. The signal wires DL branch in the X direction and connect to the switching elements 240. As illustrated in FIG. 7, the signal wires DL are formed on the first insulation layer 282, and are covered by a second insulation layer 284.

As illustrated in FIGS. 7 and 8, the common electrode CE of the second main pixel 202 is formed on the second insulation layer 284. In one example, the common electrode CE is formed from indium tin oxide (ITO). The common electrodes CE are covered by a third insulation layer 286.

As illustrated in FIGS. 5 and 6, each pixel electrode 250 of the second main pixel 202 has a comb-tooth shape, and is disposed in each of the four regions 202A. Each pixel electrode 250 is connected to each switching element 240 (drain electrode 248). As illustrated in FIG. 8, the pixel electrodes 250 are formed on the third insulation layer 286. In one example, the pixel electrodes 250 are formed from ITO.

Each switching element 240 of the second main pixel 202 is connected to each pixel electrode 250. In the present specification, as described later, each switching element 240 forms a light shield 300 that blocks light that is emitted from the back light 400 and is incident on the subpixels 104 (the first main pixels 102) of the first liquid crystal display panel 100. In other words, each switching element 240 also functions as a light shield that blocks the light that is emitted from the back light 400 and that is incident on the subpixels 104 of the first liquid crystal display panel 100.

As illustrated in FIGS. 8 and 9, each switching element 240 includes a gate electrode 242, a semiconductor layer 244, a source electrode 246, and a drain electrode 248. In one example, the switching elements 240 are implemented as TFT elements. Note that the arrangement of the switching element 240 (the light shield 300) is described later.

The gate electrode 242 is formed integrally with the scanning wire GL on the main surface 210a of the second TFT substrate 210. As with the scanning wire GL, the gate electrode 242 is covered by the first insulation layer 282. The semiconductor layer 244 is provided, via the first insulation layer 282, in an island manner on the gate electrode 242. In one example, the semiconductor layer 244 is formed from amorphous silicon. The source electrode 246 is formed integrally with the signal wire DL. The drain electrode 248 extends in the X direction from on the semiconductor layer 244 and connects to the pixel electrode 250. As illustrated in FIG. 8, the drain electrode 248 connects to the pixel electrode 250 at a contact portion 248a, via the contact hole CH. The contact hole CH penetrates the third insulation layer 286 and the second insulation layer 284. The gate electrode 242, the source electrode 246, and the drain electrode 248 are formed from a light shielding metal such as aluminum (Al), molybdenum (Mo), or the like.

As illustrated in FIGS. 7 and 8, the first insulation layer 282 covers the scanning wire GL and the gate electrode 242 of the switching element 240. The second insulation layer 284 covers the semiconductor layer 244, the source electrode 246, and the drain electrode 248 of the switching element 240, and the first insulation layer 282. The third insulation layer 286 covers the common electrode CE and the second insulation layer 284. The first insulation layer 282, the second insulation layer 284, and the third insulation layer 286 are formed from silicon nitride (SiNx), silicon oxide (SiOx), or the like.

The gate electrode 242, the source electrode 246, and the drain electrode 248 of each switching element 240 are formed from a light shielding metal. As such, each switching element 240 that includes the contact portion 248a of the drain electrode 248 functions as a light shield that blocks the light that is emitted from the back light 400 and that is incident on the subpixels 104 of the first liquid crystal display panel 100. When viewed from above from the observer side, the light shield 300 formed from the switching element 240 has the external shape illustrated in FIG. 10.

Figure 11:
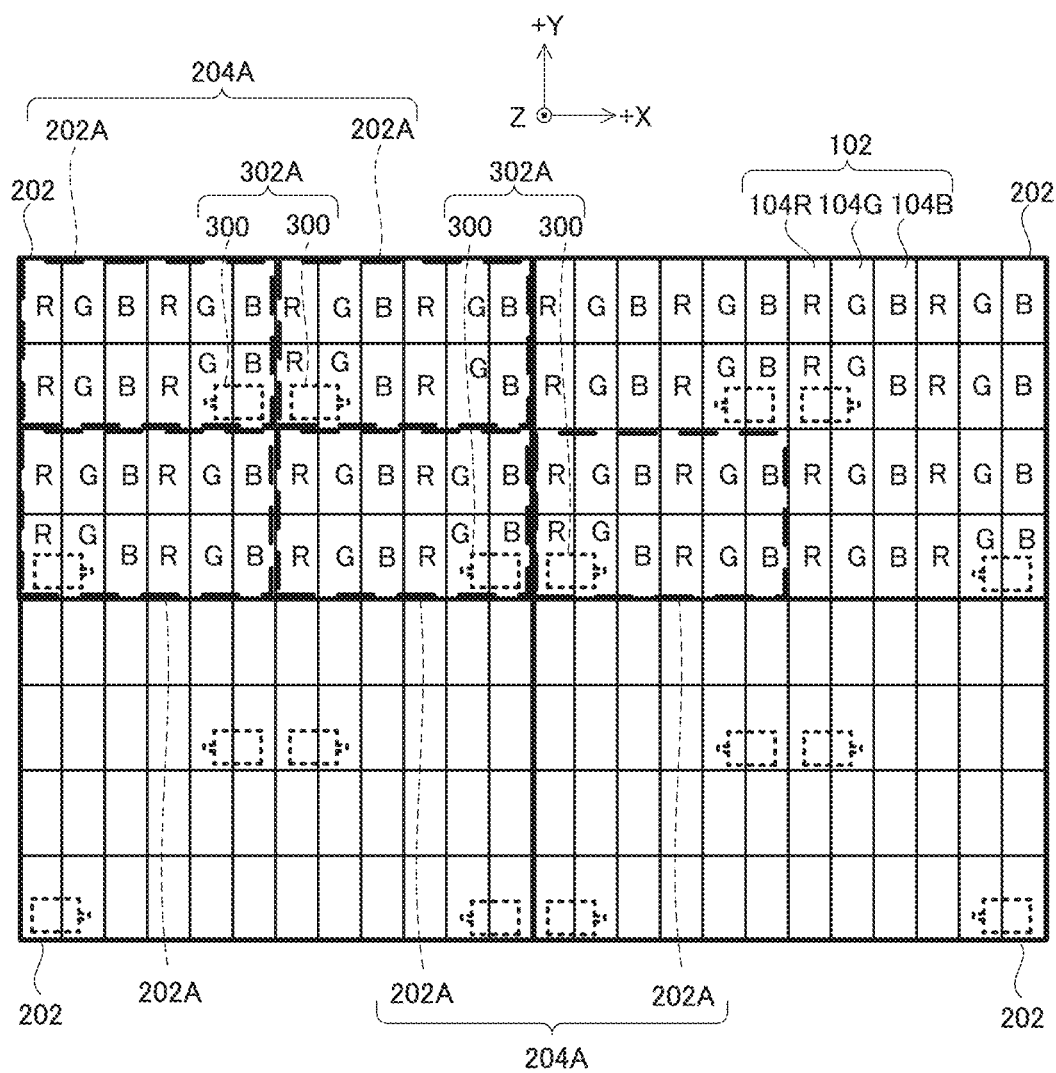
FIG. 11 is a drawing illustrating overlapping of four second main pixels and subpixels according to Embodiment 1.
Figure 12:
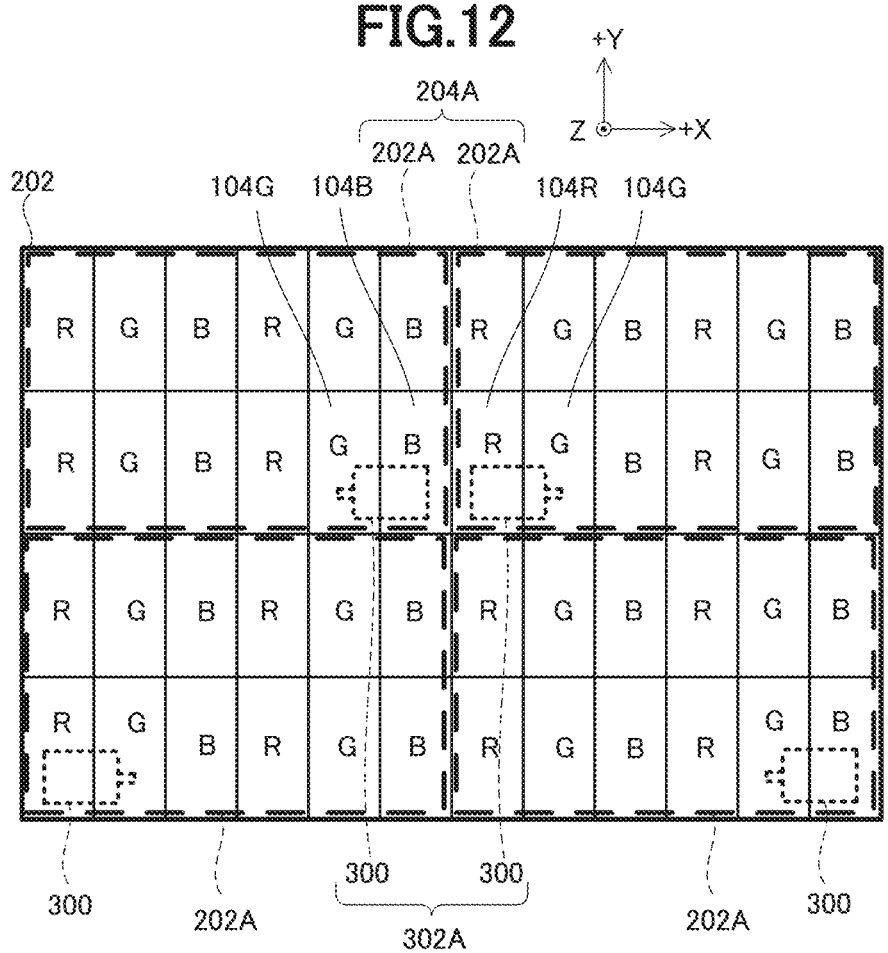
FIG. 12 is a drawing illustrating overlapping of one second main pixel and subpixels according to Embodiment 1.
Figure 13:
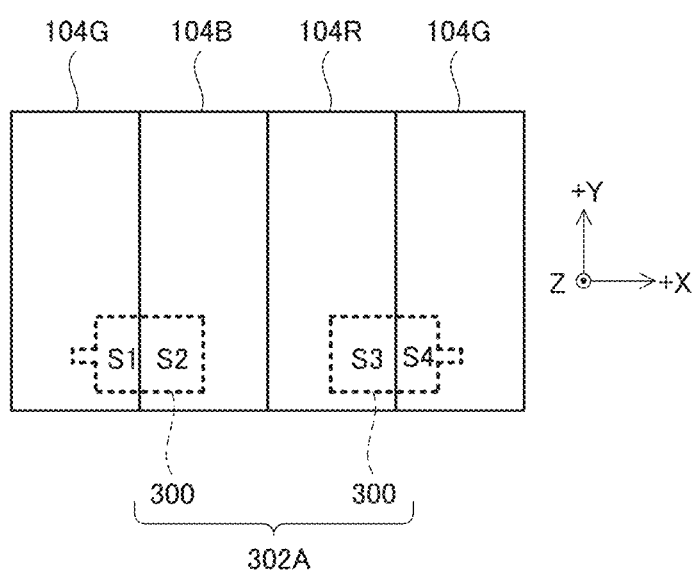
FIG. 13 is a drawing illustrating overlapping of light shields and subpixels according to Embodiment 1.

In the following, the arrangement of the light shield 300 (the switching element 240) and the overlapping of the light shield 300 and the subpixels 104 of the first liquid crystal display panel 100 are described while referencing FIGS. 11 to 13. FIG. 11 illustrates the overlapping of four second main pixels 202 and the subpixels 104. FIG. 12 illustrates the overlapping of one second main pixel 202 and the subpixels 104. FIG. 13 illustrates the overlapping of the light shield 300 and the subpixels 104. Note that, the black matrix BM of the first liquid crystal display panel 100 is omitted from FIGS. 11 to 13 and the following drawings.

In the present embodiment, as illustrated in FIGS. 11 and 12, one second main pixel 202 corresponds to 16 first main pixels 102 arranged in four rows and four columns in the X direction and the Y direction. The second main pixel 202 is divided into four regions 202A in two rows and two columns in the X direction and the Y direction. Each of the regions 202A corresponds to four first main pixels 102 in two rows and two columns in the X direction and the Y direction.

In the present embodiment, the two regions 202A adjacent in the X direction form one set 204A. Two light shields 300 are positioned within the set 204A of regions 202A. Additionally, in the set 204A adjacent in the Y direction, the position of the set 204A is shifted in the X direction an amount corresponding to one region 202A.

Furthermore, the two light shields 300 positioned within the set 204A of regions 202A form one set 302A. The two light shields 300 that form the set 302A of light shields 300 are arranged near each other. As illustrated in FIG. 11, it is preferable that the set 302A of light shields 300 is arranged in the X direction at a spacing two-times the X direction width of the region 202A, and is arranged in the Y direction at a spacing two-times the Y direction width of the region 202A. In the set 204A of regions 202A adjacent in the Y direction, the position of the set 204A is shifted in the X direction an amount corresponding to one region 202A and, as such, the arrangement of the light shield 300 is a staggered arrangement of units of the set 302A that are shifted a half pitch in the X direction and the Y direction. Note that the light shields 300 that form the set 302A of light shields 300 correspond to the switching elements 240 that connect to the pixel electrodes 250 arranged in each of the two regions 202A that form the set 204A of regions 202A and, in FIG. 5, correspond to the two neighboring switching elements 240 that are positioned on the +Y side.

As illustrated in FIGS. 11 to 13, the set 302A of light shields 300 overlaps four subpixels 104 arranged continuously in the X direction, and blocks the light that is incident on these subpixels 104. Specifically, the set 302A of light shields 300 overlaps the four subpixels 104 arranged in order from the −X side of a green subpixel 104G, a blue subpixel 104B, a red subpixel 104R, and a green subpixel 104G. The set 302A of light shields 300 blocks the light that is emitted from the back light 400 and that is incident on these subpixels 104. Of the light shields 300 forming the set 302A of light shields 300, the light shield 300 positioned on the −X side straddles the green subpixel 104G and the blue subpixel 104B to block the light that is incident on the green subpixel 104G and the blue subpixel 104B. Of the light shields 300 forming the set 302A of light shields 300, the light shield 300 positioned on the +X side straddles the red subpixel 104R and the green subpixel 104G to block the light that is incident on the red subpixel 104R and the green subpixel 104G.

As illustrated in FIG. 13, when S1 is an area where the light shield 300 positioned on the −X side shields the green subpixel 104G, S2 is an area where the light shield 300 positioned on the −X side shields the blue subpixel 104B, S3 is an area where the light shield 300 positioned on the +X side shields the red subpixel 104R, and S4 is an area where the light shield 300 positioned on the +X side shields the green subpixel 104G, the light shield 300 positioned on the −X side and the light shield 300 positioned on the +X side are arranged such that S1+S4=S2=S3. Accordingly, the area (S1+S4) that the set 302A of light shields 300 shields the green subpixels 104G (the two green subpixels 104G), the area (S2) that the set 302A of light shields 300 shields the blue subpixel 104B, and the area (S3) that the set 302A of light shields 300 shields the red subpixel 104R are equal. That is, the set 302A of light shields 300 equally shields, for each color, the subpixels 104 arranged continuously in the X direction.

In the present embodiment, the set 302A of light shields 300 is arranged in a staggered manner in the X direction and the Y direction in units of the set 302A, and the subpixels 104 arranged continuously in the X direction are, for each color, equally shielded by the set 302A of light shields 300. As such, subpixels 104 of a specific color are not periodically shielded. Additionally, color differences caused by the subpixels 104 being shielded are averaged out for the entire displaying of the liquid crystal display device 10. Accordingly, the liquid crystal display device 10 can suppress color moire.

Furthermore, in one second main pixel 202, the four light shields 300 (FIG. 12) positioned within the second main pixel 202 equally shield, as a set of four and for each color, the subpixels 104. Due to this, when a shift occurs in the overlapping of the second liquid crystal display panel 200 and the first liquid crystal display panel 100, or when viewing the displaying of the liquid crystal display device 10 from the diagonal direction, the four light shields 300 can, as a set of four and for each color, substantially equally shield the subpixels 104 that are of different colors. Accordingly, the liquid crystal display device 10 can further suppress color moire.

Next, the suppression of the color moire obtained as a result of the set 302A of light shields 300 equally shielding, for each color, the subpixels 104 arranged continuously in the X direction is described. In this description, the size of the 16 (four rows, four columns) first pixels 102 in the liquid crystal display device 10 is 259 µm×259 µm. The area of one of the light shields 300 of the liquid crystal display device 10 is 1469 µm².

Figure 14:
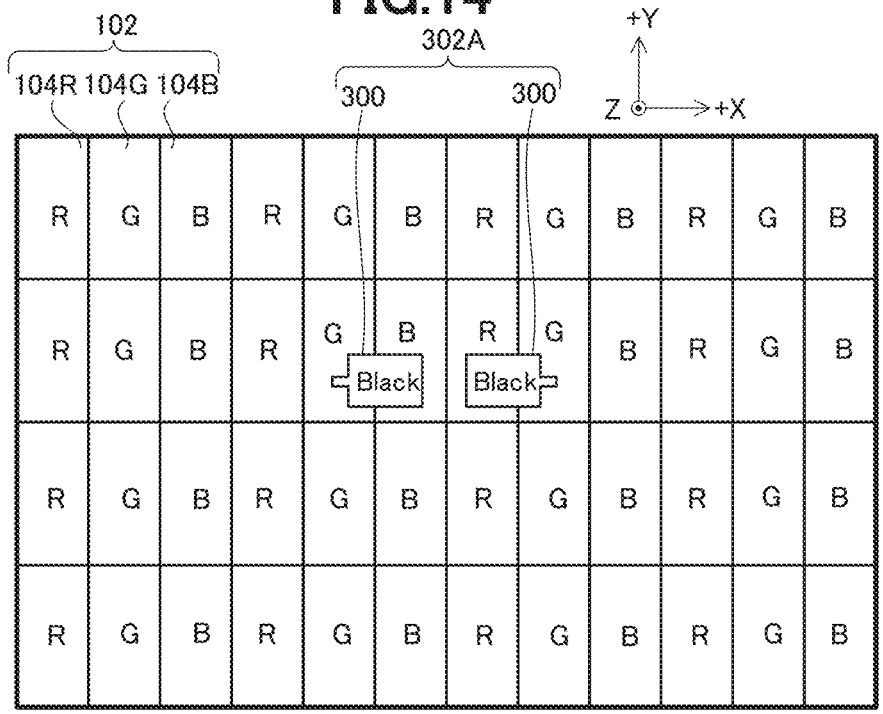
FIG. 14 is a drawing illustrating a unit image viewed from the front according to Embodiment 1.
Figure 15:
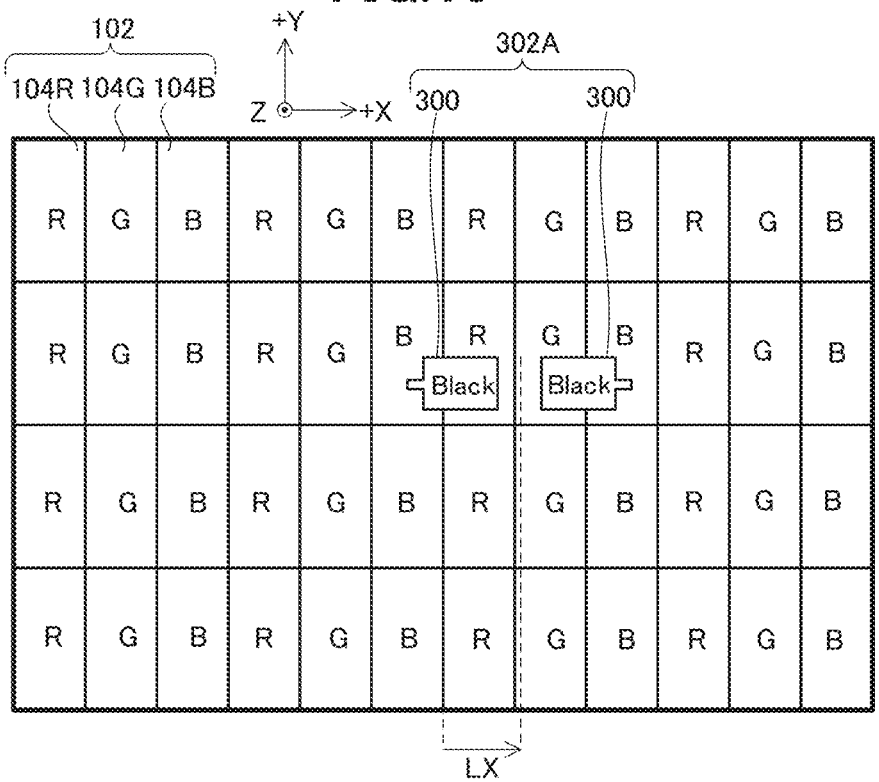
FIG. 15 is a drawing illustrating an example of the unit image viewed diagonally according to Embodiment 1.

Firstly, unit images simulating 16 first main pixels 102 and a set 302A of light shields 300, viewed from the observer side, are created. The created unit images are a unit image of the 16 first main pixels 102 and the set 302A of light shields 300 viewed from the front, and a unit image of the 16 first main pixels 102 and the set 302A of light shields 300 viewed from a diagonal direction. FIG. 14 illustrates the unit image viewed from the front. FIG. 15 illustrates an example of the unit image viewed from the diagonal direction.

Figure 16:
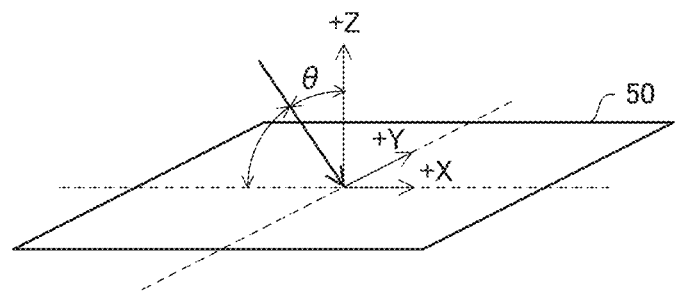
FIG. 16 is a drawing illustrating an angle of a viewing direction according to Embodiment 1.

In the unit image viewed from the diagonal direction, in consideration of the thickness, refractive index, and the like of the first liquid crystal display panel 100 and the second liquid crystal display panel 200, the position of the set 302A of light shields 300 shifts in the +X direction an amount corresponding to a distance LX from the position of the set 302A of light shields 300 in the unit image viewed from the front, in accordance with an angle θ (θ=2.2°, 4.3°, 6.3°, 8.3°, 10.3°, 12.3°) of the viewing direction. The viewing direction is a direction toward the −X side from the front, and the angle θ is, as illustrated in FIG. 16, an angle (left rotation) relative to the +Z direction.

In the unit images, the colors of the red subpixel 104R, the green subpixel 104G, and the blue subpixel 104B are defined as their respective colors (red, green, and blue), and the brightness of the color of the red subpixel 104R, the green subpixel 104G, and the blue subpixel 104B is defined as the brightness of a state in which the first main pixels 102 display white when viewed from the front. Additionally, the light shields 300 are illustrated in black. Note that, to facilitate comprehension, the two light shields 300 not forming the set 302A within the second main pixel 202 corresponding to the 16 first main pixels 102 are omitted.

Figure 17:
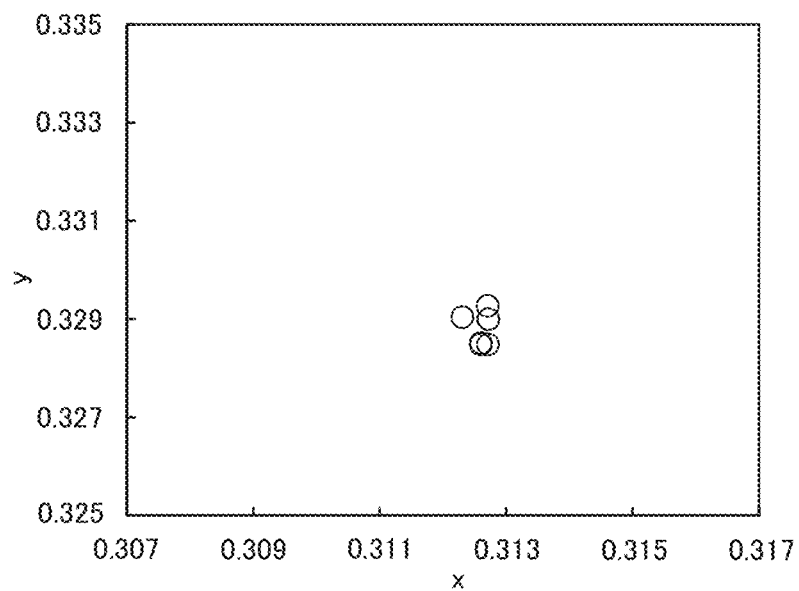
FIG. 17 is a drawing illustrating x values and y values in an evaluation image according to Embodiment 1.

Next, the created unit images are arranged in a matrix (for example, m images×n images) to create evaluation images viewed from the front (1024 pixels×1024 pixels) and evaluation images viewed form the diagonal direction (θ=2.2°, 4.3°, 6.3°, 8.3°, 10.3°, 12.3°). Furthermore, an RGB value (8 bits, 0 to 255 steps), obtained by averaging the entire evaluation image, is obtained from the created evaluation images. Moreover, an x value and a y value in CIE color space are calculated from an obtained RGB brightness value. FIG. 17 illustrates the x values and the y values in the evaluation image viewed from the front and the evaluation image viewed from the diagonal direction.

As illustrated in FIG. 17, the range that the x value and the y value vary depending on the viewing direction is less than 0.01. In an objective evaluation, when the range that the x value and the y value vary is 0.01 or less, the observer is not able to recognize, or is not bothered by, the color moire.

The evaluation images correspond to a state of viewing, from the front or from the diagonal direction, a liquid crystal display device in which the set 302A of light shields 300 is equally shielding, for each color, the subpixels 104 arranged continuously in the X direction. Accordingly, color moire can be suppressed by the set 302A of light shields 300 equally shielding, for each color, the subpixels 104 of different colors that are arranged continuously in the X direction.

Next, the angle θ of the viewing direction, and a light shielding rate SH of the light shields 300 is described. The light shielding rate SH of the light shields 300 is the ratio of the area where the light shields 300 (four light shields) positioned within one second main pixel 202 block the light from the back light 400 that is incident on the opening of each of the red subpixels 104R (16 subpixels), the green subpixels 104G (16 subpixels), and the blue subpixels 104B (16 subpixels) corresponding to the one second main pixel 202. As described above, the positions of the light shields 300 relative to the subpixels 104 change in accordance with the angle θ of the viewing direction and, as such, the light shielding rate SH of the light shields 300 changes in accordance with the angle θ of the viewing direction.

Figure 18:
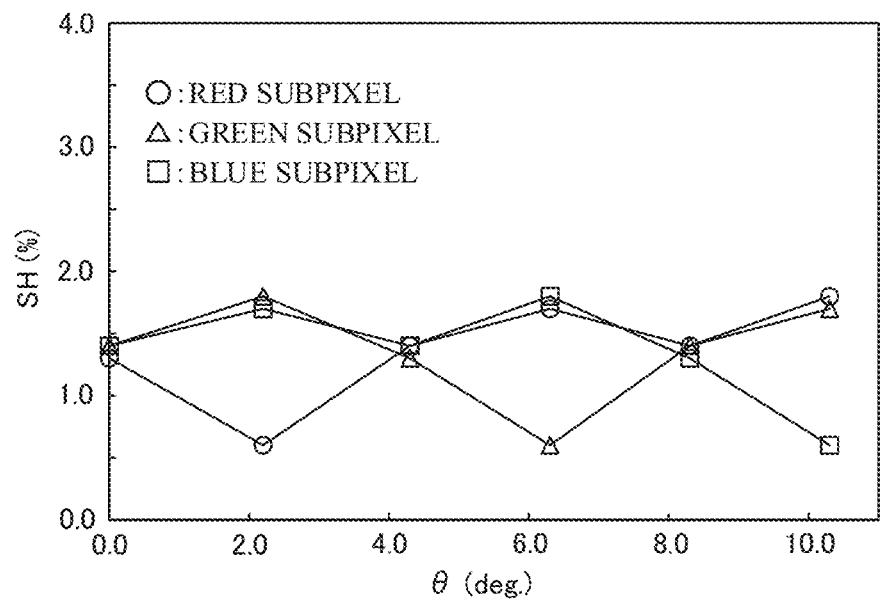
FIG. 18 is a drawing illustrating light shielding rates according to Embodiment 1.
Figure 19:
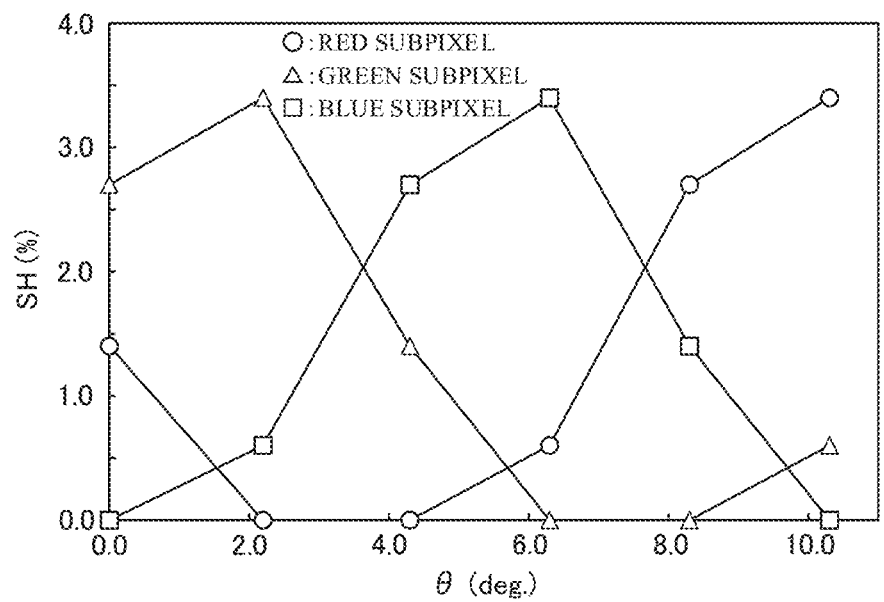
FIG. 19 is a drawing illustrating light shielding rates according to a Comparative Example.
Figure 20:
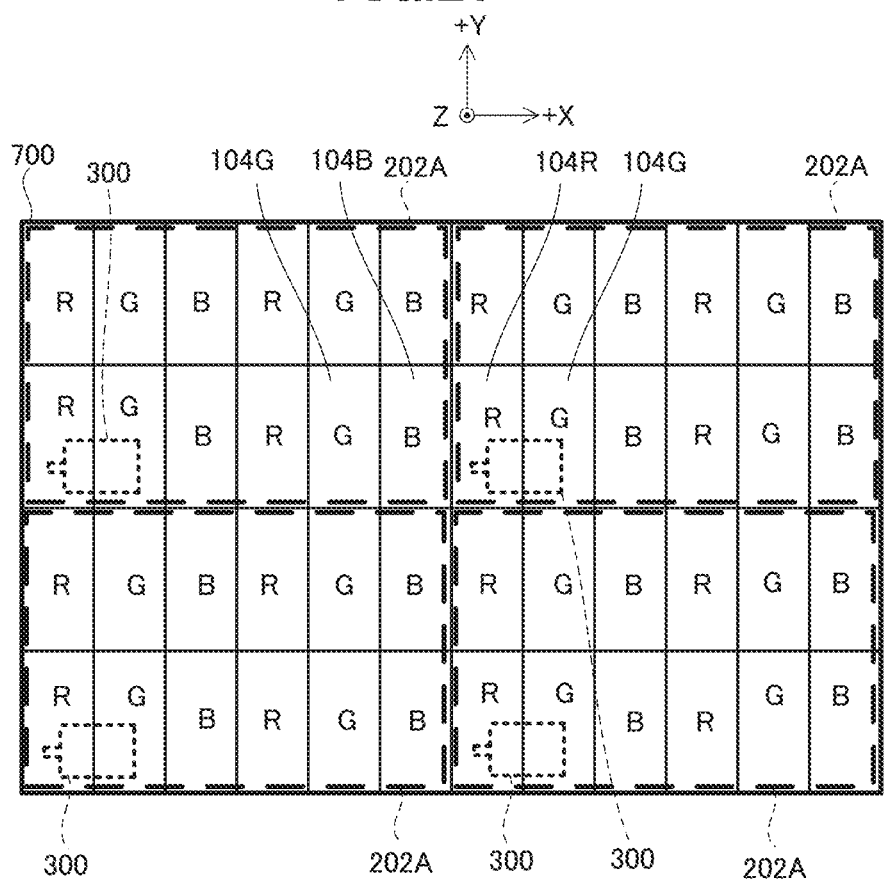
FIG. 20 is a drawing illustrating overlapping of light shields and subpixels according to the Comparative Example.

FIG. 18 illustrates the light shielding rate SH of the present embodiment, and FIG. 19 illustrates the light shielding rate SH of a Comparative Example. As illustrated in FIG. 20, in a main pixel 700 of the Comparative Example, the four light shields 300 are arranged in parallel rows in the X direction and the Y direction.

Firstly, the light shielding rate SH of the Comparative Example is described. As illustrated in FIG. 19, when transitioning the angle of the viewing direction gradually from the front (0°) to the diagonal direction, the light shielding rate SH of the green subpixels 104G slightly increases from the front, and decreases from when the angle θ=2.2°. Meanwhile, when the angle θ=2.2°, the light shielding rates SH of the red subpixels 104R and the blue subpixels 104B are small. Accordingly, in the Comparative Example, mixed colors of red and blue are emphasized when the angle θ=2.2°. The light shielding rate SH of the blue subpixels 104B increases from the front to the angle θ=6.3°, and decreases when the angle θ=6.3° or less. Meanwhile, the light shielding rates SH of the red subpixels 104R and the green subpixels 104G are small when the angle θ=6.3°. Accordingly, in the Comparative Example, mixed colors of red and green are emphasized when the angle θ=6.3°. The light shielding rate SH of the red subpixels 104R decreases from the front to the angle θ=2.2°, and increases from near the angle θ=4° toward the angle θ=10.3°. Meanwhile, the light shielding rates SH of the green subpixels 104G and the blue subpixels 104B are small when the angle θ=10.3°. Accordingly, in the Comparative Example, mixed colors of green and blue are emphasized when the angle θ=10.3°. That is, in the Comparative Example, due to changes in the viewing angle, the subpixels 104 shielded by the light shields 300 change from the green subpixels 104G to the blue subpixels 104B, and then from the blue subpixels 104B to the red subpixels 104R. Consequently, the color mixture of red, green, and blue becomes unbalanced. As are result, color moire is seen by the observer.

As illustrated in FIG. 18, in the present embodiment, when the angle θ=2.2°, 6.3°, and 10.3°, the light shielding rates SH of the red subpixels 104R, the green subpixels 104G, and the blue subpixels 104B differ from each other. However, the change of the light shielding rate SH relative to the angle θ of the viewing direction is small. Additionally, when the angle θ=0°, 4.3°, and 8.3°, the light shielding rates SH of the red subpixels 104R, the green subpixels 104G, and the blue subpixels 104B are substantially equal. Accordingly, unbalances of the color mixture of red, green, and blue are suppressed, even when a shift occurs in the overlapping of the second liquid crystal display panel 200 and the first liquid crystal display panel 100, or when viewing the displaying of the liquid crystal display device 10 from the diagonal direction. As a result, the four light shields 300 can substantially equally shield, for each color, the subpixels 104 of different colors, and the liquid crystal display device 10 can suppress color moire.

Back Light

As illustrated in FIG. 1, the back light 400 is disposed on a back side (the −Z side) of the second liquid crystal display panel 200. In one example, the back light 400 is implemented as a directly under type back light. The back light 400 includes a white light emitting diode (LED) element, a reflecting sheet, a diffusing sheet, and the like (all not illustrated in the drawings).

Display Controller

Figure 21:
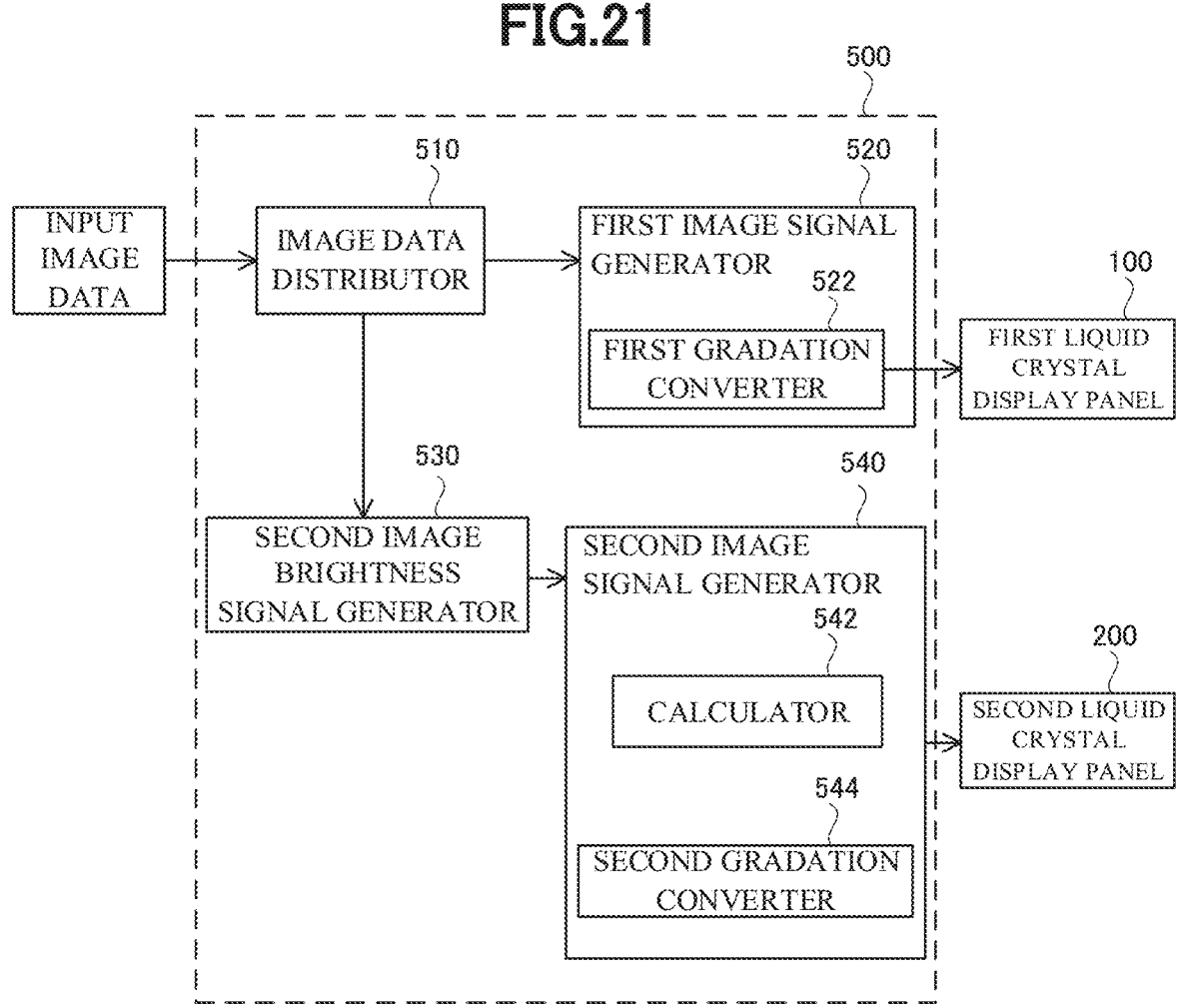
FIG. 21 is a block diagram illustrating a display controller according to Embodiment 1.

The display controller 500 controls the displaying of the first liquid crystal display panel 100 and the second liquid crystal display panel 200. As illustrated in FIG. 21, the display controller 500 includes an image data distributor 510, a first image signal generator 520, a second image brightness signal generator 530, and a second image signal generator 540.

The image data distributor 510 distributes input image data to the first image signal generator 520 and the second image brightness signal generator 530.

The first image signal generator 520 generates, from the input image data distributed from the image data distributor 510, a color image to be displayed on the first liquid crystal display panel 100. Specifically, a first gradation converter 522 of the first image signal generator 520 performs gradation conversion for converting the distributed input image data to color image data having brightness-gradation characteristics suited to the first liquid crystal display panel 100. A lookup table in which input-output relationships are set in advance is used in the conversion of the data. The first image signal generator 520 sends, to the first driver circuit 136 of the first liquid crystal display panel 100, a color image signal expressing the generated color image.

The second image brightness signal generator 530 generates, from the input image data distributed from the image data distributor 510, a brightness signal for generating a monochrome image to be displayed on the second liquid crystal display panel 200. In one example, the second image brightness signal generator 530 calculates a brightness level of one second main pixel 202 of the second liquid crystal display panel 200 from the average value, the frequent value, the minimum value, the maximum value, or the like of red gradation values, green gradation values, and blue gradation values in the 16 first main pixels 102 of the first liquid crystal display panel 100 on which the light transmitted the one second main pixel 202 of the second liquid crystal display panel 200 is incident. The calculated brightness level may be a gradation value. The second image brightness signal generator 530 sends, to the second image signal generator 540, a brightness signal expressing the calculated brightness level.

The second image signal generator 540 generates, on the basis of the brightness signal sent from the second image brightness signal generator 530, a monochrome image to be displayed on the second liquid crystal display panel 200. In one example, the second image signal generator 540 generates a monochrome image that is subjected to averaging processing and gradation conversion. Specifically, a calculator 542 of the second image signal generator 540 averages, by a weighted average based on, for example, the distance from a target second main pixel 202, the brightness levels of second main pixels 202 positioned within a predetermined distance from the target second main pixel 202. As a result, the second image signal generator 540 can generate a monochrome image that has blurred edges. Furthermore, a second gradation converter 544 of the second image signal generator 540 generates a monochrome image having brightness-gradation characteristics suited to the second liquid crystal display panel 200. The configuration of the second gradation converter 544 is the same as that of the first gradation converter 522 of the first image signal generator 520.

Due to the calculation of the brightness level, the averaging processing, and the like executed by the second image brightness signal generator 530, the monochrome image signal sent to the second liquid crystal display panel 200 is delayed with respect to the color image signal sent to the first liquid crystal display panel 100. As such, the display controller 500 includes a non-illustrated synchronization circuit for synchronizing the outputs of the monochrome image signal and the color image signal. Due to the synchronization circuit, the monochrome image corresponding to the color image of the first liquid crystal display panel 100 is displayed on the second liquid crystal display panel 200 and, as such, a color image suited to the liquid crystal display device 10 is displayed.

The display controller 500 includes a central processing unit (CPU), a memory, and the like. In one example, the CPU executes programs stored in the memory to realize the functions of the display controller 500.

As described above, the set 302A of light shields 300 is arranged in a staggered manner in units of the set 302A, and the subpixels 104 arranged continuously in the X direction are equally shielded, for each color, by the set 302A of light shields 300. As such, the liquid crystal display device 10 can suppress color moire. Furthermore, the four light shields 300 positioned within the second main pixel 202 equally shield, as a set of four and for each color, the subpixels 104 and, as such, the liquid crystal display device 10 can further suppress color moire.

Additionally, the second main pixel 202 of the second liquid crystal display panel 200 is divided into a plurality of regions 202A, and the pixel electrode 250 is provided in each region 202A. As such, the liquid crystal display device 10 can suppress the generation of dark spots that are easily visible to the observer. Dark spot is defect by defective operation of the pixel electrode 250.

Embodiment 2

In Embodiment 1, the second main pixel 202 of the second liquid crystal display panel 200 is divided into four regions 202A in two rows and two columns. However, the number of divisions of the second main pixel 202 is not limited to four. As with the liquid crystal display device 10 of Embodiment 1, a liquid crystal display device 10 of the present embodiment includes a panel 50, a back light 400, and a display controller 500. The configurations of the first liquid crystal display panel 100, the switching elements 240 (the light shields 300) of the second liquid crystal display panel 200, and the like are the same as in Embodiment 1. As such, next, the arrangement of the light shield 300, and the overlapping of the light shield 300 and the subpixels 104 of the first liquid crystal display panel 100 are described.

Figure 22:
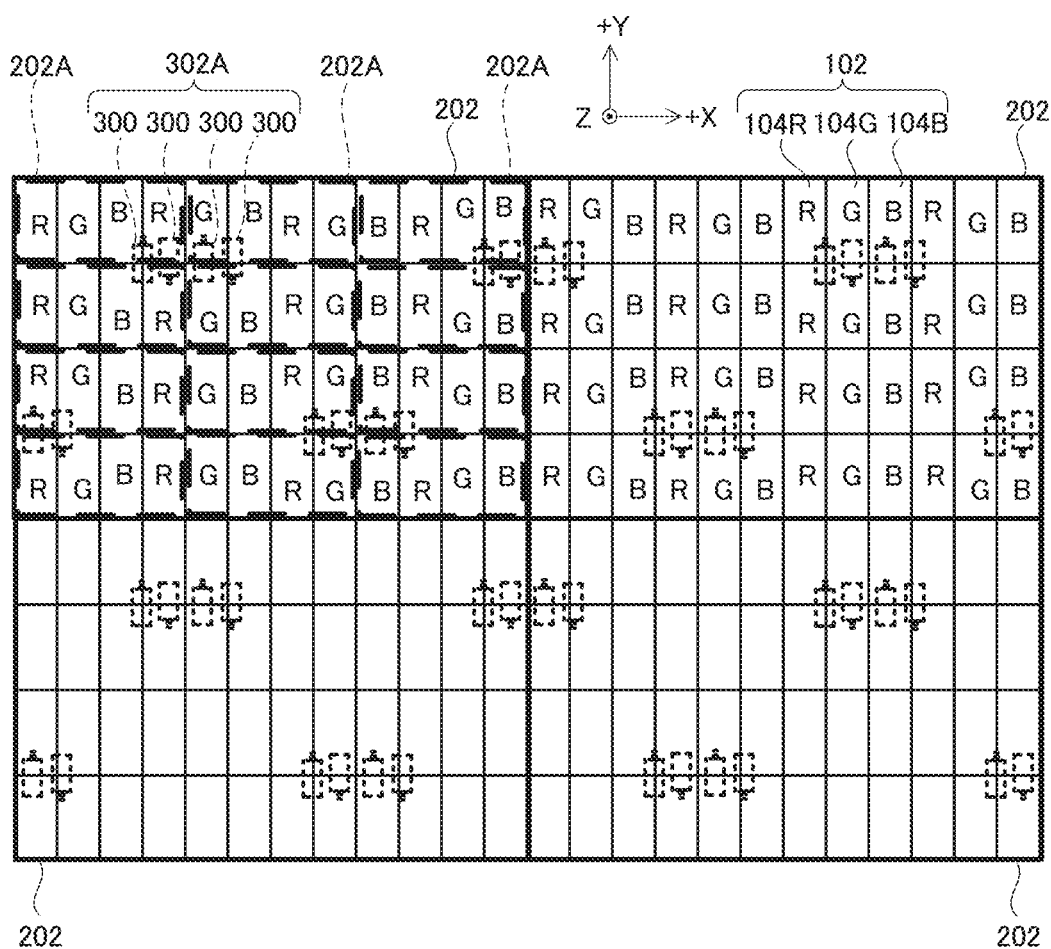
FIG. 22 is a drawing illustrating overlapping of four second main pixels and subpixels according to Embodiment 2.
Figure 23:
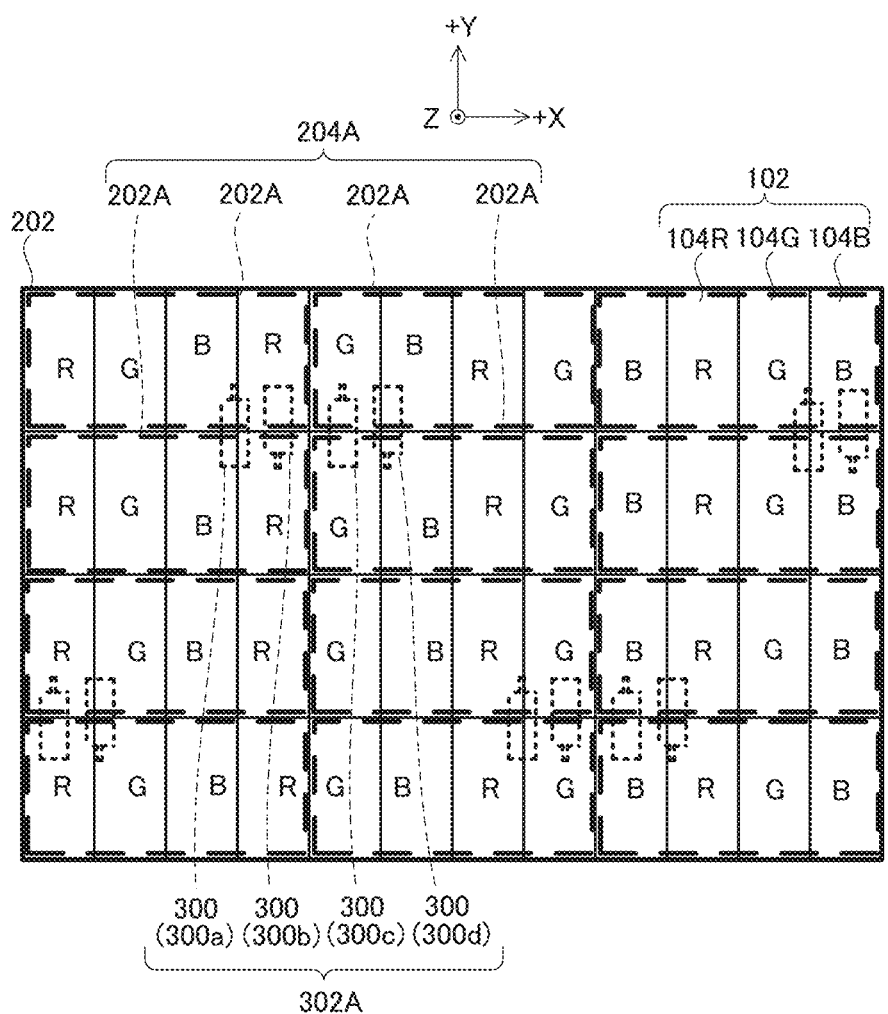
FIG. 23 is a drawing illustrating overlapping of one second main pixel and subpixels according to Embodiment 2.

As in Embodiment 1, in the present embodiment, one second main pixel 202 corresponds to 16 first main pixels 102 arranged in four rows and four columns in the X direction and the Y direction. As illustrated in FIGS. 22 and 23, the second main pixel 202 of the present embodiment is divided into 12 regions 202A, in four rows and three columns in the X direction and the Y direction. Each region 202A corresponds to four subpixels 104 arranged in the X direction.

Additionally, four adjacent regions 202A in two rows and two columns in the X direction and the Y direction form one set 204A. Four light shields 300 are positioned within the set 204A of regions 202A. In the set 204A adjacent in the Y direction, the position of the set 204A is shifted in the X direction an amount corresponding to one region 202A.

Figure 24:
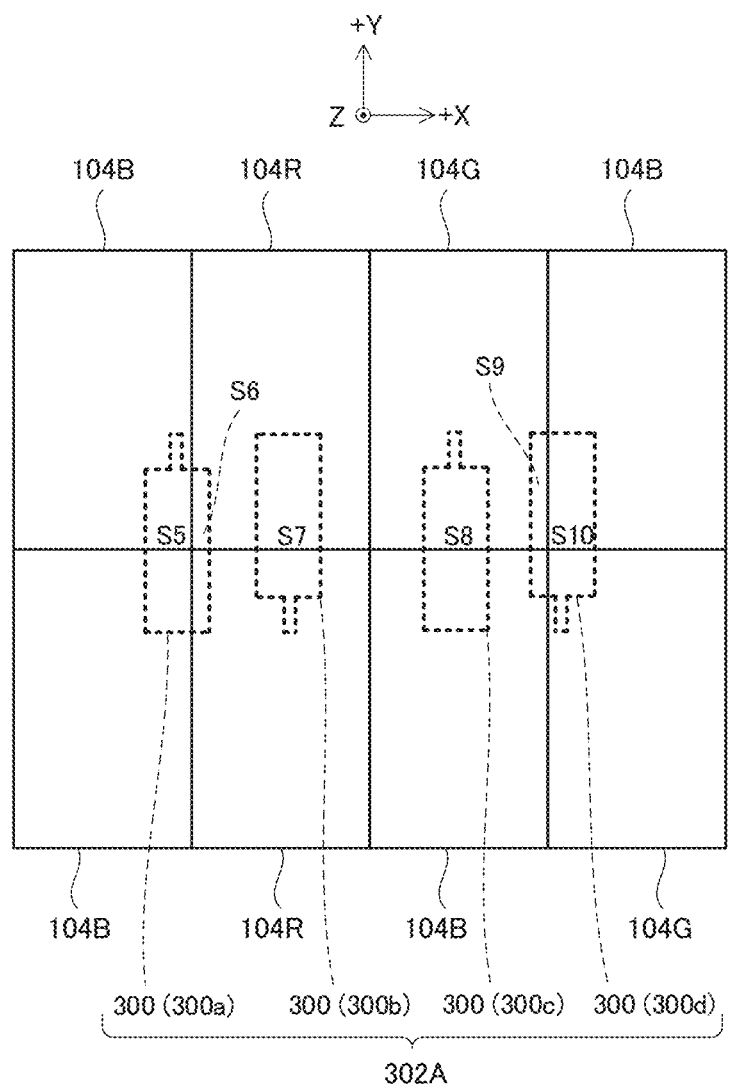
FIG. 24 is a drawing illustrating overlapping of light shields and subpixels according to Embodiment 2.

In the present embodiment, the four light shields 300 positioned within the set 204A of regions 202A form one set 302A. The four light shields 300 that form the set 302A of light shields 300 are, as illustrated in FIGS. 22 to 24, arranged in the X direction in one row, and are disposed near each other. The light shields 300 that form the set 302A of light shields 300 correspond to the switching elements 240 that connect to the pixel electrodes 250 arranged in each of the four regions 202A that form the set 204A of regions 202A.

As illustrated in FIG. 22, it is preferable that the set 302A of light shields 300 is arranged in the X direction at a spacing two-times the X direction width of the region 202A, and is arranged in the Y direction at a spacing four-times the Y direction width of the region 202A. In the set 204A of regions 202A adjacent in the Y direction, the position of the set 204A is shifted in the X direction an amount corresponding to one region 202A and, as such, the arrangement of the light shield 300 is a staggered arrangement of units of the set 302A that are shifted a half pitch in the X direction and the Y direction. In the present embodiment, the four light shields 300 that form the set 302A of light shields 300 are also referred to, in order from the −X side, as a light shield 300a, a light shield 300b, a light shield 300c, and a light shield 300d.

As illustrated in FIGS. 22 to 24, the set 302A of light shields 300 overlaps eight subpixels 104 in 2 rows and 4 columns in the X direction and the Y direction, and blocks the light that is incident on these subpixels 104. In the example illustrated in FIG. 23, the set 302A of light shields 300 overlaps, in order from the −X side, two blue subpixels 104B, two red subpixels 104R, two green subpixels 104G, and two blue subpixels 104B. The set 302A of light shields 300 blocks the light that is emitted from the back light 400 and that is incident on these subpixels 104.

The light shield 300a straddles the two blue subpixels 104B arranged in the Y direction and the two red subpixels 104R arranged in the Y direction to block the light that is incident on these subpixels 104. The light shield 300b blocks the light that is incident on the two red subpixels 104R arranged in the Y direction. The light shield 300c blocks the light that is incident on the two green subpixels 104G arranged in the Y direction. The light shield 300d straddles the two green subpixels 104G arranged in the Y direction and the two blue subpixels 104B arranged in the Y direction to block the light that is incident on these subpixels 104.

As illustrated in FIG. 24, when S5 is the area where the light shield 300a shields the two blue subpixels 104B arranged in the Y direction, S6 is the area where the light shield 300a shields the two red subpixels 104R arranged in the Y direction, S7 is the area where the light shield 300b shields the two red subpixels 104R arranged in the Y direction, S8 is the area where the light shield 300c shields the two green subpixels 104G arranged in the Y direction, S9 is the area where the light shield 300d shields the two green subpixels 104G arranged in the Y direction, and S10 is the area where the light shield 300d shields the two blue subpixels 104B arranged in the Y direction, the light shields 300a to 300d are arranged such that S5+S10=S6+S7=S8+S9. Accordingly, the area (S5+S10) that the set 302A of light shields 300 shields the blue subpixels 104B (the four blue subpixels 104B), the area (S6+S7) that the set 302A of light shields 300 shields the red subpixels 104R (the two red subpixels 104R), and the area (S8+S9) that the set 302A of light shields 300 shields the green subpixels 104G are equal. That is, as in Embodiment 1, the set 302A of light shields 300 of the present embodiment also equally shields, for each color, the subpixels 104 arranged continuously in the X direction. Accordingly, in the present embodiment as well, the liquid crystal display device 10 can suppress color moire.

Furthermore, in one second main pixel 202, the 12 light shields 300 (FIG. 23) positioned within the second main pixel 202 equally shield, as a set of 12 and for each color, the subpixels 104. Accordingly, as with the liquid crystal display device 10 of Embodiment 1, the liquid crystal display device 10 of the present embodiment can further suppress color moire.

As described above, the set 302A of light shields 300 is arranged in a staggered manner in units of the set 302A, and the subpixels 104 arranged continuously in the X direction are equally shielded, for each color, by the set 302A of light shields 300. As such, the liquid crystal display device 10 of the present embodiment can suppress color moire. Additionally, the 12 light shields 300 positioned within the second main pixel 202 equally shield, as a set of 12 and for each color, the subpixels 104 and, as such, the liquid crystal display device 10 of the present embodiment can further suppress color moire. Furthermore, the pixel electrode 250 is provided in each region 202A and, as such, the liquid crystal display device 10 of the present embodiment can suppress the generation of dark spots that are easily visible to the observer.

Embodiment 3

In Embodiment 2, the second main pixel 202 is divided into 12 regions 202A, in four rows and three columns in the X direction and the Y direction. However, a configuration is possible in which the second main pixel 202 is divided into 16 regions 202A, in four rows and four columns in the X direction and the Y direction. As with the liquid crystal display device 10 of Embodiment 1, a liquid crystal display device 10 of the present embodiment includes a panel 50, a back light 400, and a display controller 500. The configurations of the first liquid crystal display panel 100, the switching elements 240 (the light shields 300) of the second liquid crystal display panel 200, and the like are the same as in Embodiment 1. As such, next, the arrangement of the light shield 300, and the overlapping of the light shield 300 and the subpixels 104 of the first liquid crystal display panel 100 are described.

Figure 25:
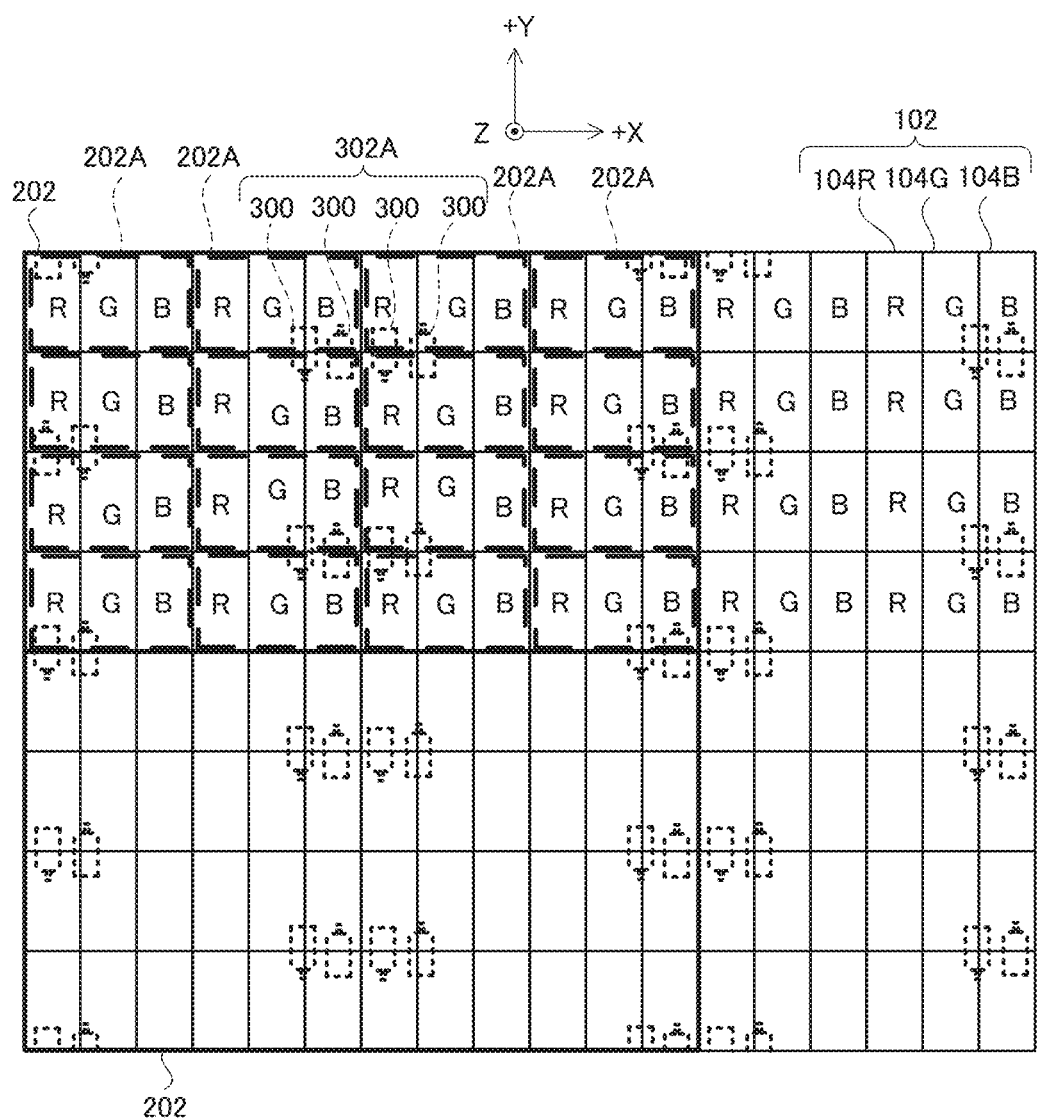
FIG. 25 is a drawing illustrating overlapping of second main pixels and subpixels according to Embodiment 3.
Figure 26:
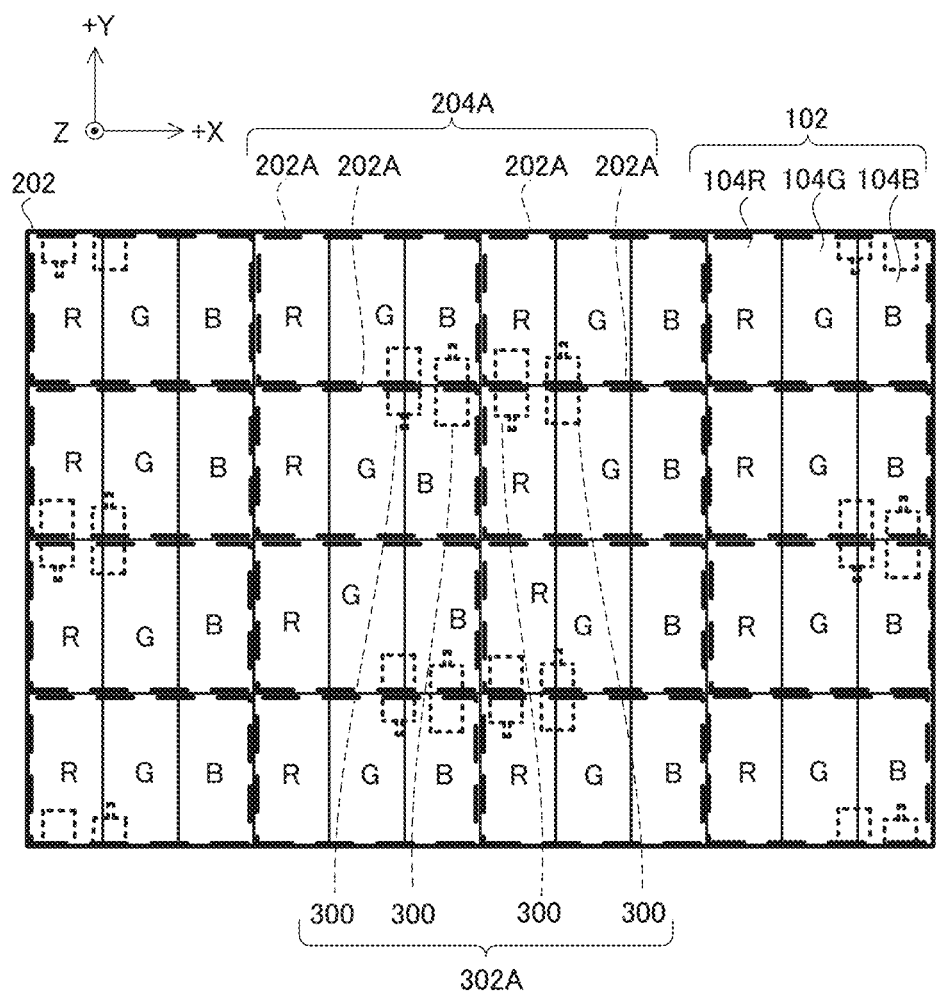
FIG. 26 is a drawing illustrating overlapping of one second main pixel and subpixels according to Embodiment 3.

As in Embodiment 1, in the present embodiment, one second main pixel 202 corresponds to 16 first main pixels 102 in four rows and four columns in the X direction and the Y direction. As illustrated in FIGS. 25 and 26, the second main pixel 202 of the present embodiment is divided into 16 regions 202A, in four rows and four columns in the X direction and the Y direction. Each region 202A corresponds to three subpixels 104 arranged in the X direction (one first main pixel 102).

Additionally, four adjacent regions 202A in two rows and two columns in the X direction and the Y direction form one set 204A. Four light shields 300 are positioned within the set 204A of regions 202A. In the set 204A adjacent in the X direction, the position of the set 204A is shifted in the Y direction an amount corresponding to one region 202A.

As in Embodiment 2, the four light shields 300 positioned within the set 204A of regions 202A form one set 302A. The four light shields 300 that form the set 302A of light shields 300 are arranged in the X direction in one row, and are disposed near each other. The light shields 300 that form the set 302A of light shields 300 correspond to the switching elements 240 that connect to the pixel electrodes 250 arranged in each of the four regions 202A that form the set 204A of regions 202A. As illustrated in FIG. 25, it is preferable that the sets 302A of the light shields 300 are arranged in the X direction at intervals four-times the X direction width of the region 202A, and are arranged in the Y direction at intervals two-times the Y direction width of the region 202A. In the set 204A of regions 202A adjacent in the X direction, the position of the set 204A is shifted in the Y direction an amount corresponding to one region 202A and, as such, the arrangement of the light shield 300 is a staggered arrangement of units of the set 302A that are shifted a half pitch in the X direction and the Y direction.

As illustrated in FIGS. 25 and 26, the set 302A of light shields 300 overlaps eight subpixels 104 in 2 rows and 4 columns in the X direction and the Y direction, and blocks the light that is incident on these subpixels 104. In the example illustrated in FIGS. 25 and 26, the set 302A of light shields 300 overlaps, in order from the −X side, two green subpixels 104G, two blue subpixels 104B, two red subpixels 104R, and two green subpixels 104G. The set 302A of light shields 300 blocks the light that is emitted from the back light 400 and that is incident on these subpixels 104.

As in Embodiment 2, the area where the set 302A of light shields 300 shields the green subpixels 104G (the four green subpixels 104G), the area where the set 302A of light shields 300 shields the blue subpixels 104B (the two blue subpixels 104B), and the area where the set 302A of light shields 300 shields the red subpixels 104R (the two red subpixels 104R) are equal. That is, as in Embodiment 2, the set 302A of light shields 300 of the present embodiment also equally shields, for each color, the subpixels 104 arranged continuously in the X direction. Furthermore, in one second main pixel 202, the light shields 300 (FIG. 26) positioned within the second main pixel 202 equally shield, with one set and for each color, the subpixels 104.

As described above, in the present embodiment as well, the set 302A of light shields 300 is arranged in a staggered manner in units of the set 302A, and the subpixels 104 arranged continuously in the X direction are equally shielded, for each color, by the set 302A of light shields 300. As a result, the liquid crystal display device 10 can suppress color moire. Additionally, the light shields 300 positioned within the second main pixel 202 equally shield, with one set and for each color, the subpixels 104 and, as such, the liquid crystal display device 10 of the present embodiment can further suppress color moire. Furthermore, the pixel electrode 250 is provided in each region 202A and, as such, the liquid crystal display device 10 of the present embodiment can suppress the generation of dark spots that are easily visible to the observer.

Embodiment 4

In Embodiments 1 to 3, the light shields 300 are formed from the switching elements 240. The set 204A of Embodiment 1 is formed from two regions 202A, and the set 204A of Embodiment 2 and Embodiment 3 is formed from four regions 202A. However, a configuration is possible in which the light shield 300 is formed from a dummy light shielding layer. Additionally, a configuration is possible in which the set of region 202A is a set formed from four regions 202A and a set formed from two regions 202A. In the following, the light shield formed from the dummy light shielding layer is referred to as a light shield 310.

As with the liquid crystal display device 10 of Embodiment 1, a liquid crystal display device 10 of the present embodiment includes a panel 50, a back light 400, and a display controller 500. The configurations of the first liquid crystal display panel 100, the switching elements 240 (the light shields 300) of the second liquid crystal display panel 200, and the like are the same as in Embodiment 1. As such, next, a dummy light shielding layer DM, the arrangement of the light shields 300, 310, and the overlapping of the light shields 300, 310 and the subpixels 104 of the first liquid crystal display panel 100 are described.

Figure 27:
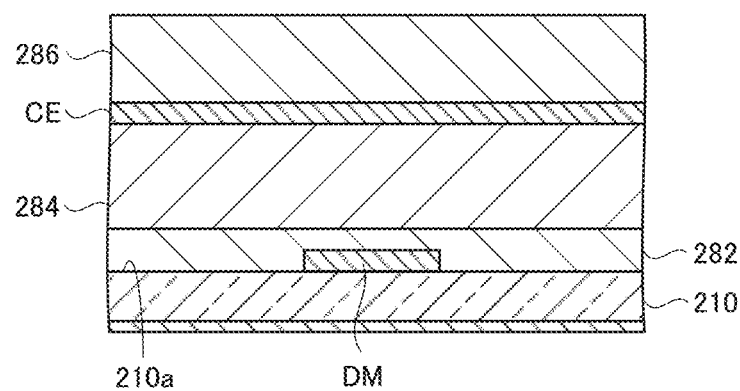
FIG. 27 is a cross-sectional view illustrating a dummy light shielding layer according to Embodiment 4.

Firstly, the dummy light shielding layer DM, and the light shield 310 formed from the dummy light shielding layer DM are described. The dummy light shielding layer DM is formed from a light shielding metal, a light shielding organic material, or the like. In one example, as illustrated in FIG. 27, the dummy light shielding layer DM is formed on the main surface 210a of the second TFT substrate 210.

Figure 28:
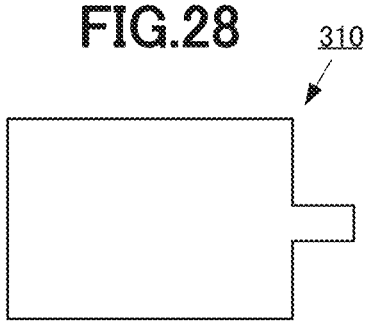
FIG. 28 is a plan view illustrating an external shape of a light shield formed from the dummy light shielding layer, according to Embodiment 4.

When viewed from above from the observer side, the dummy light shielding layer DM functions as a light shield that blocks the light that is emitted from the back light 400 and that is incident on the subpixels 104 of the first liquid crystal display panel 100. As illustrated in FIG. 28, the light shield 310 formed from the dummy light shielding layer DM has the same external shape as the light shield 300.

Next, the arrangement of the light shields 300, 310, and the overlapping of the light shields 300, 310 and the subpixels 104 of the first liquid crystal display panel 100 are described.

Figure 29:
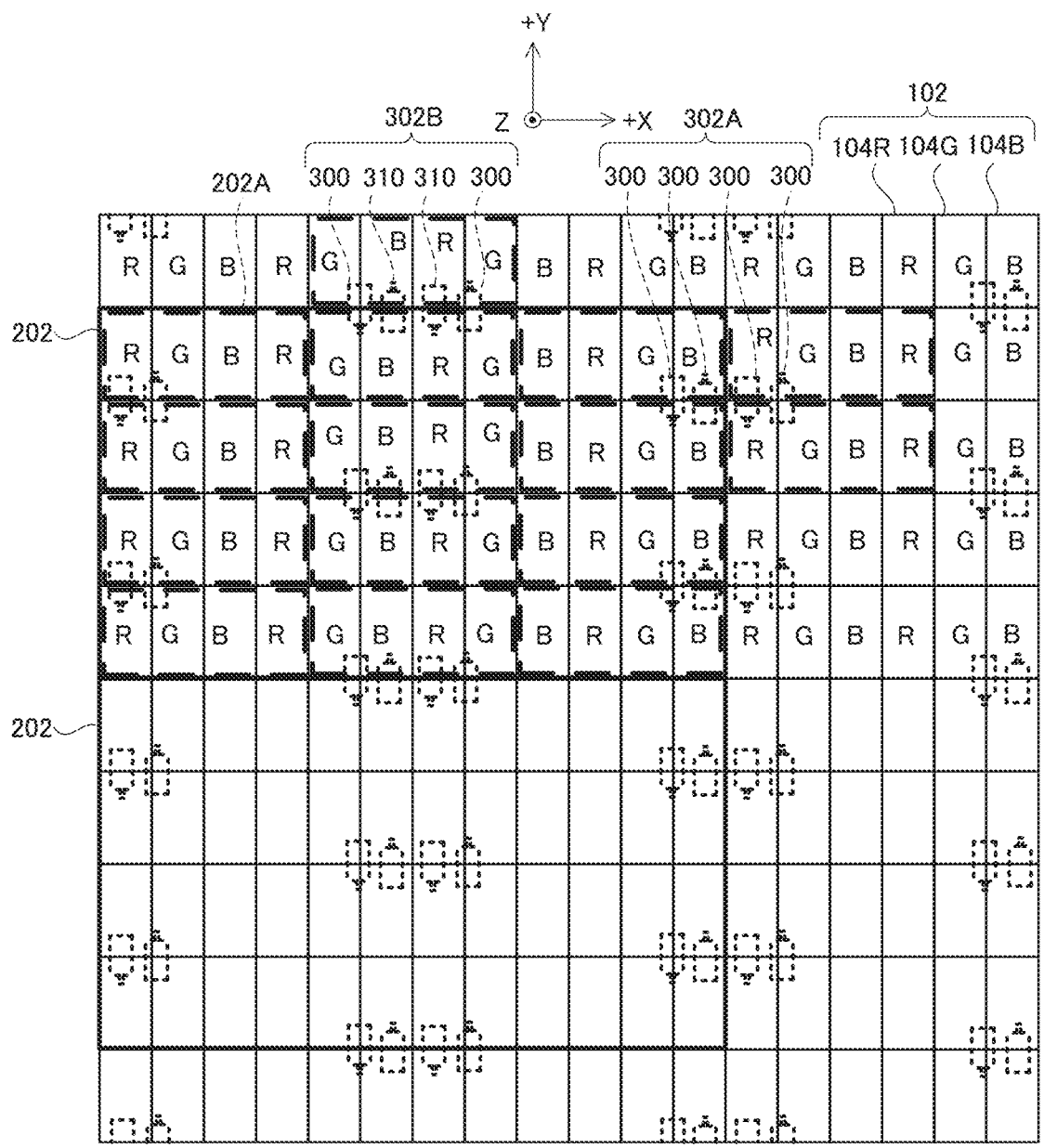
FIG. 29 is a drawing illustrating overlapping of second main pixels and subpixels according to Embodiment 4.
Figure 30:
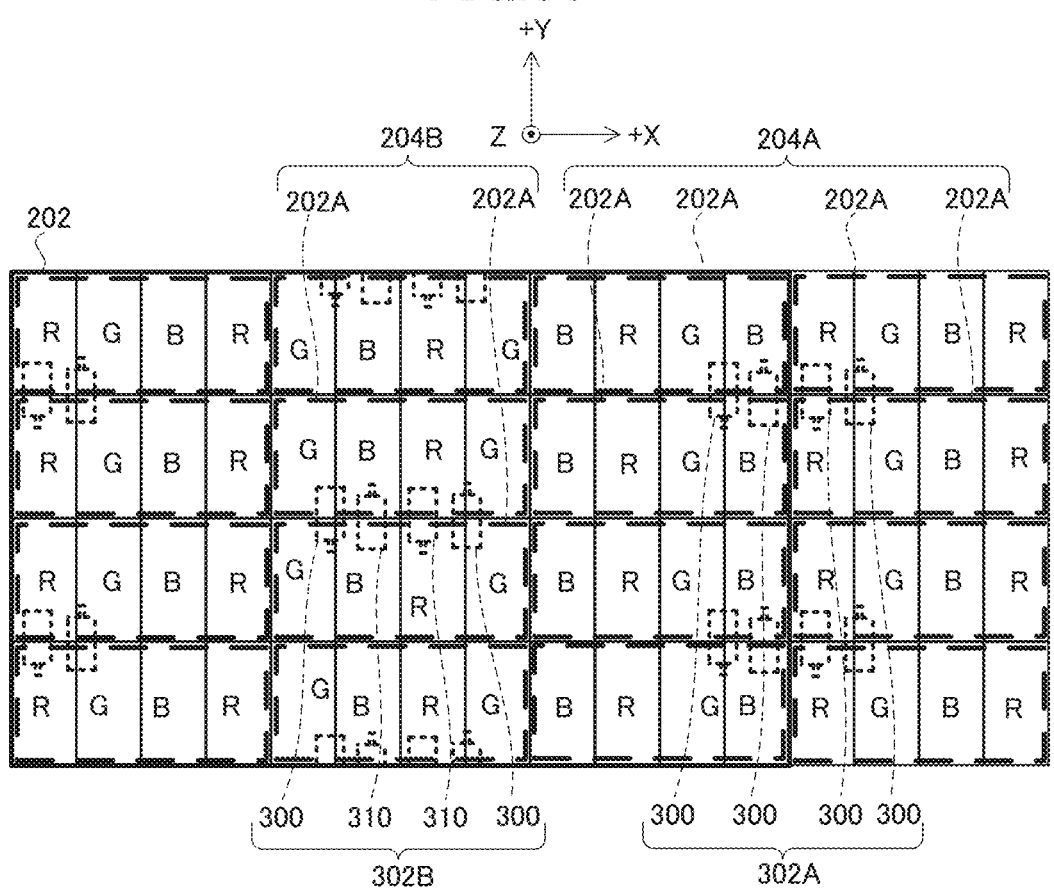
FIG. 30 is a drawing illustrating overlapping of a second main pixel and subpixels according to Embodiment 4.

As in Embodiment 1, in the present embodiment, one second main pixel 202 corresponds to 16 first main pixels 102 in four rows and four columns in the X direction and the Y direction. As illustrated in FIGS. 29 and 30, the second main pixel 202 of the present embodiment is divided into 12 regions 202A, in four rows and three columns in the X direction and the Y direction. Each region 202A corresponds to four subpixels 104 arranged in the X direction.

In the present embodiment, four adjacent regions 202A in two rows and two columns in the X direction and the Y direction form one set 204A. Four light shields 300 are positioned within the set 204A of regions 202A.

Two regions 202A adjacent in the Y direction form one set 204B. Two light shields 300 and two light shields 310 are positioned within the set 204B of regions 202A.

The set 204A of regions 202A and the set 204B of regions 202A are each arranged in the Y direction, and a row in the Y direction of the set 204A and a row in the Y direction of the set 204B are arranged in an alternating manner in the X direction. In the row in the Y direction of the set 204A and the row in the Y direction of the set 204B, the positions of the set 204A of regions 202A and the set 204B of regions 202A are shifted in the Y direction an amount corresponding to one region 202A. Note that the set 204A of regions 202A corresponds to a first set, and the set 204B of regions 202A corresponds to a second set. The row in the Y direction of the set 204A of regions 202A corresponds to a first row, and the row in the Y direction of the set 204B of regions 202A corresponds to a second row.

The four light shields 300 positioned within the set 204A of regions 202A form one set 302A. The four light shields 300 that form the set 302A of light shields 300 are arranged in the X direction in one row, and are disposed near each other. The light shields 300 that form the set 302A correspond to the switching elements 240 that connect to the pixel electrodes 250 arranged in each of the four regions 202A that form the set 204A of regions 202A.

The two light shields 300 and the two light shields 310 positioned within the set 204B of the regions 202A form one set 302B. The four light shields (The two light shields 300 and the two light shields 310) that form the set 302B of light shields 300, 310 arranged in one row in the X direction, and are disposed near each other. The light shields 300 that form the set 302B correspond to the switching elements 240 that connect to the pixel electrodes 250 arranged in each of the two regions 202A that form the set 204B of regions 202A. The light shields 310 that form the set 302B are light shields formed from the dummy light shielding layer DM.

As illustrated in FIG. 29, it is preferable that the set 302A of light shields 300 is arranged in the X direction at a spacing three-times the X direction width of the region 202A, and is arranged in the Y direction at a spacing two-times the Y direction width of the region 202A. In the row in the Y direction of the set 204A and the row in the Y direction of the set 204B, the positions of the set 204A and the set 204B are shifted in the Y direction an amount corresponding to one region 202A. As such, the arrangement of sets of light shields (the set 302A and the set 302B) is a staggered arrangement shifted a half pitch in the X direction and the Y direction.

As illustrated in FIGS. 29 and 30, the set 302A of light shields 300 overlaps eight subpixels 104 in 2 rows and 4 columns in the X direction and the Y direction, and blocks the light that is incident on these subpixels 104. The set 302A of light shields 300 overlaps, in order from the −X side, two green subpixels 104G, two blue subpixels 104B, two red subpixels 104R, and two green subpixels 104G. The set 302A of light shields 300 blocks the light that is emitted from the back light 400 and that is incident on these subpixels 104.

The set 302B of the light shields 300, 310 also overlaps eight subpixels 104 in 2 rows and 4 columns in the X direction and the Y direction, and blocks the light that is incident on these subpixels 104. The set 302B of light shields 300, 310 also overlaps, in order from the −X side, two green subpixels 104G, two blue subpixels 104B, two red subpixels 104R, and two green subpixels 104G. The set 302B of light shields 300 blocks the light that is emitted from the back light 400 and that is incident on these subpixels 104.

As in Embodiment 2, the area where the sets of light shields (the set 302A and the set 302B) shield the green subpixels 104G (the four green subpixels 104G), the area where the sets of light shields shield the blue subpixels 104B (the two blue subpixels 104B), and the area where the sets of light shields shield the red subpixels 104R (the two red subpixels 104R) are equal. That is, as in Embodiment 2, the set 302A of light shields 300 and the set 302B of light shields 300, 310 equally shield, for each color, the subpixels 104 arranged continuously in the X direction. Furthermore, in one second main pixel 202, the light shields 300, 310 (FIG. 30) positioned within the second main pixel 202 equally shield, with one set and for each color, the subpixels 104.

As described above, in the present embodiment, the sets of light shields (the set 302A and the set 302B) are arranged in a staggered manner in units of the sets, and the subpixels 104 arranged continuously in the X direction are equally shielded, for each color, by the set 302A of light shields 300 and the set 302B of light shields 300, 310. Accordingly, the liquid crystal display device 10 can suppress color moire. Additionally, the light shields 300, 310 positioned within the second main pixel 202 equally shield, with one set and for each color, the subpixels 104 and, as such, the liquid crystal display device 10 of the present embodiment can further suppress color moire. Furthermore, the pixel electrode 250 is provided in each region 202A and, as such, the liquid crystal display device 10 of the present embodiment can suppress the generation of dark spots that are easily visible to the observer.

Embodiment 5

In Embodiments 1 to 4, the light shields 300, 310 forming the set are disposed close to each other, and the light shields 300, 310 are arranged in a staggered manner in units of the set. Additionally, the set 302A of light shields 300 and the set 302B of light shields 300, 310 equally shield, for each color, the subpixels 104 arranged continuously in the X direction.

However, a configuration is possible in which one each of the light shields 300, 310 are arranged in a staggered manner. Additionally, a configuration is possible in which the set of light shields 300, 310 equally shield, for each color, each subpixel 104 of continuously arranged rows of subpixels 104 of the same color (a row of red subpixels 104R, a row of green subpixels 104G, and a row of blue subpixels 104B).

As with the liquid crystal display device 10 of Embodiment 1, a liquid crystal display device 10 of the present embodiment includes a panel 50, a back light 400, and a display controller 500. The configurations of the first liquid crystal display panel 100, the switching elements 240 (the light shields 300) of the second liquid crystal display panel 200, and the like are the same as in Embodiment 1. As such, next, the arrangement of the light shield 300, and the overlapping of the light shield 300 and the subpixels 104 of the first liquid crystal display panel 100 are described.

Figure 31:
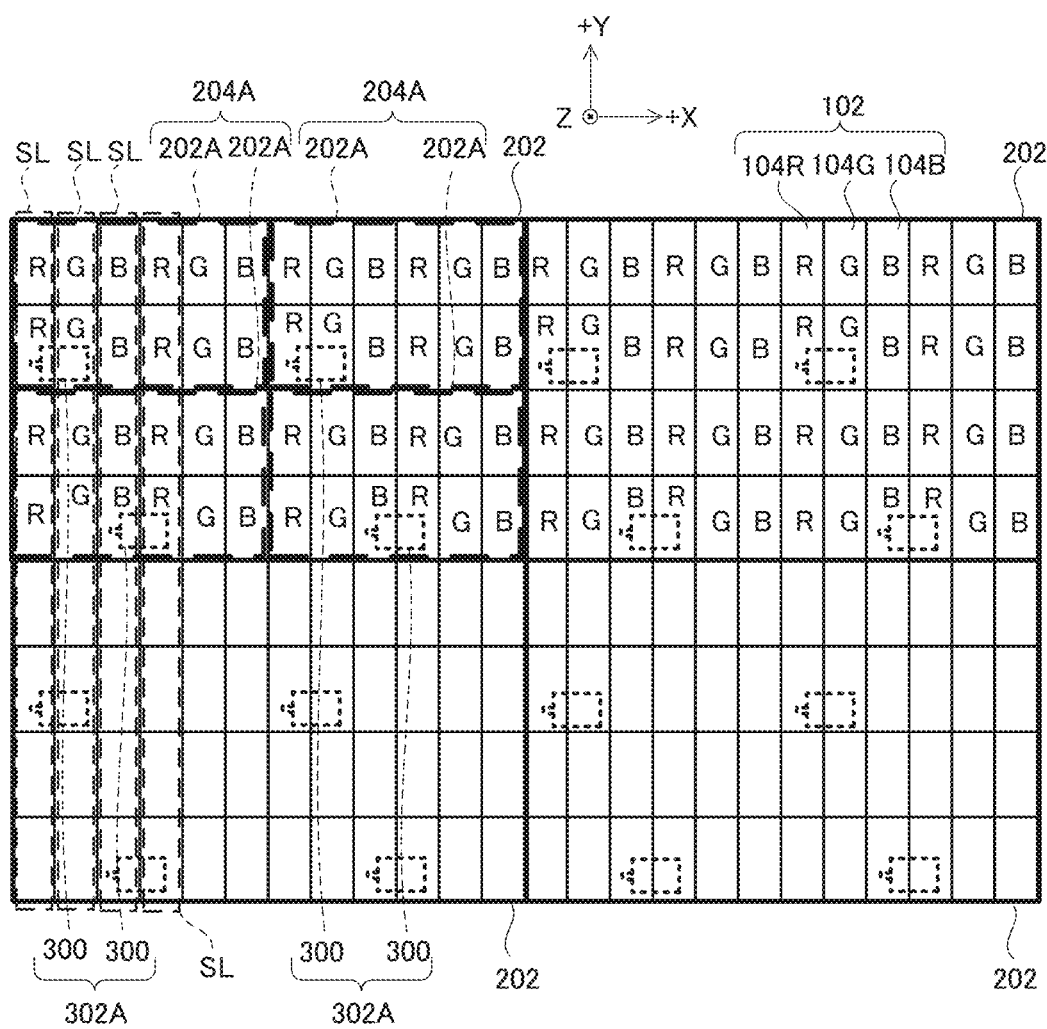
FIG. 31 is a drawing illustrating overlapping of second main pixels and subpixels according to Embodiment 5.

As in Embodiment 1, in the present embodiment, one second main pixel 202 corresponds to 16 first main pixels 102 in four rows and four columns in the X direction and the Y direction. As illustrated in FIG. 31, the second main pixel 202 of the present embodiment is divided into 4 regions 202A, in two rows and two columns in the X direction and the Y direction. Each of the regions 202A corresponds to four first main pixels 102 in two rows and two columns in the X direction and the Y direction.

In the present embodiment, the two regions 202A adjacent in the Y direction form one set 204A. The set 204A of regions 202A is arranged in a matrix in the X direction and the Y direction. Two light shields 300 are positioned within the set 204A of regions 202A. The light shields 300 correspond to the switching elements 240 that connect to the pixel electrodes 250 arranged in each of the two regions 202A that form the set 204A of regions 202A.

The two light shields 300 within the set 204A of regions 202A are disposed shifted in the X direction in each of the two regions 202A. Accordingly, the light shield 300 is arranged one at a time in a staggered manner.

The two light shields 300 within the set 204A of regions 202A form one set 302A. The set 302A of light shields 300 equally shields, with one set and for each color, each subpixel 104 of the continuously arranged rows SL of subpixels 104 of the same color. Specifically, the set 302A of light shields 300 overlaps each subpixel 104 of a row SL of red subpixels 104R, a row SL of green subpixels 104G, a row SL of blue subpixels 104B, and a row SL of red subpixels 104R, the rows SL being arranged continuously from the −X side, and blocks the light from the back light that is incident on these subpixels 104.

The area where the set 302A of light shields 300 shields the two red subpixels 104R, the area where the set 302A of light shields 300 shields the green subpixel 104G, and the area where the set 302A of light shields 300 shields the blue subpixel 104B are equal. Accordingly, when viewing as one unit of the set 204A in which the regions 202A are arranged in the Y direction, subpixels 104 of specific colors are not periodically shielded. Since subpixels 104 of specific colors are not periodically shielded, the liquid crystal display device 10 can suppress color moire.

Furthermore, in one second main pixel 202, the four light shields 300 positioned within the second main pixel 202 equally shield, as a set of four and for each color, the subpixels 104. Accordingly, the liquid crystal display device 10 can further suppress color moire.

Figure 32:
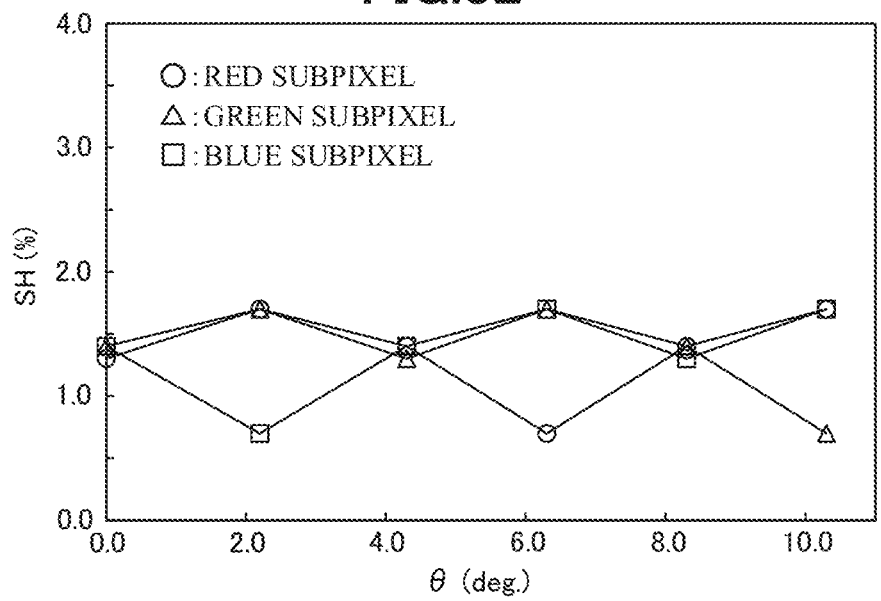
FIG. 32 is a drawing illustrating light shielding rates according to Embodiment 5.

Specifically, as illustrated in FIG. 32, in the present embodiment, the change of the light shielding rate SH relative to the angle θ of the viewing direction is small. Accordingly, when a shift occurs in the overlapping of the second liquid crystal display panel 200 and the first liquid crystal display panel 100, or when viewing the displaying of the liquid crystal display device 10 from the diagonal direction, the four light shields 300 can substantially equally shield, for each color, the subpixels 104 that are of different colors, and the liquid crystal display device 10 can suppress color moire.

As described above, in the present embodiment as well, the liquid crystal display device 10 can suppress color moire. Furthermore, the pixel electrode 250 is provided in each region 202A and, as such, the liquid crystal display device 10 of the present embodiment can suppress the generation of dark spots that are easily visible to the observer.

Embodiment 6

In Embodiment 5, the set 302A of light shields 300 equally shields, with one set and for each color, each subpixel 104 of the continuously arranged rows SL of subpixels 104 of the same color. However, a configuration is possible in which the light shield 300 arranged in a staggered manner one at a time equally shields, with one set and for each color, the subpixels 104.

As with the liquid crystal display device 10 of Embodiment 1, a liquid crystal display device 10 of the present embodiment includes a panel 50, a back light 400, and a display controller 500. The configurations of the first liquid crystal display panel 100, the switching elements 240 (the light shields 300) of the second liquid crystal display panel 200, and the like are the same as in Embodiment 1. As such, next, the arrangement of the light shield 300, and the overlapping of the light shield 300 and the subpixels 104 of the first liquid crystal display panel 100 are described.

Figure 33:
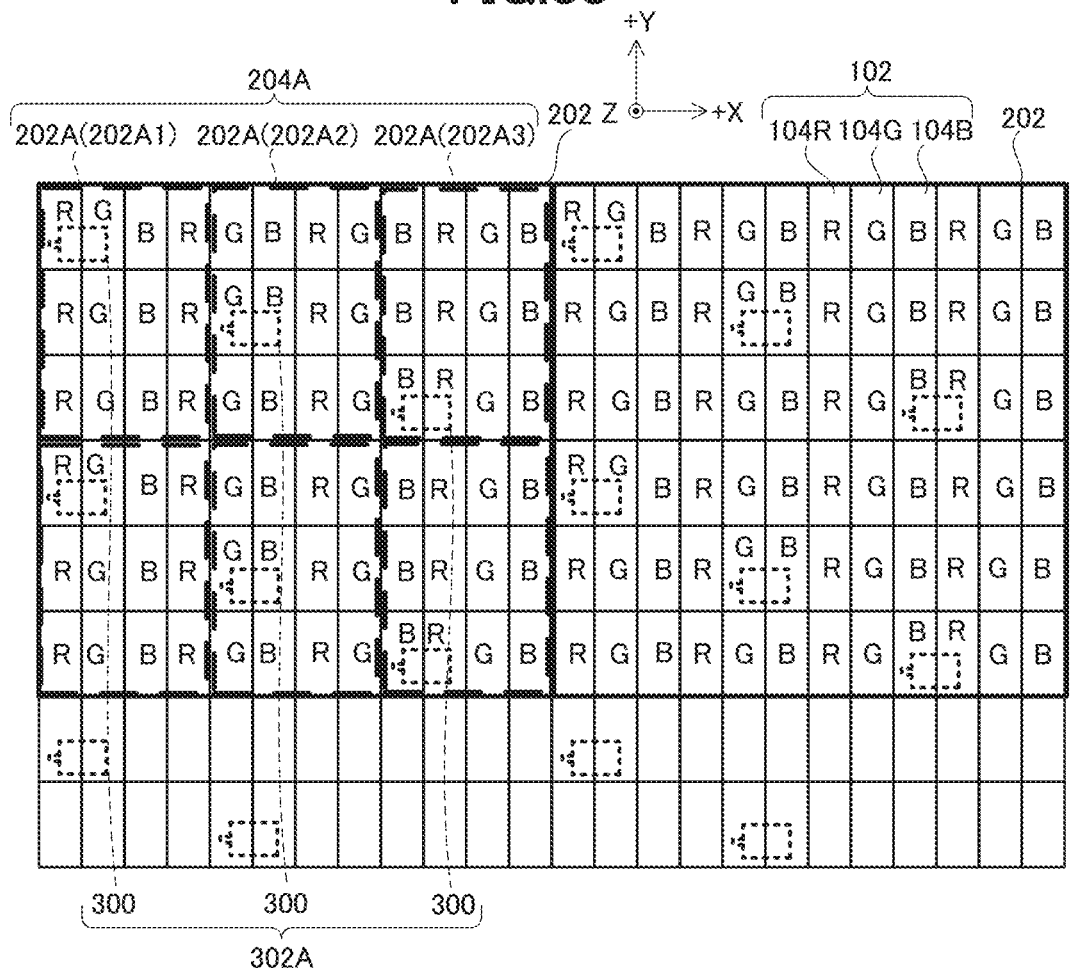
FIG. 33 is a drawing illustrating overlapping of second main pixels and subpixels according to Embodiment 6.

In the present embodiment, as illustrated in FIG. 33, one second main pixel 202 corresponds to 24 first main pixels 102 arranged in six rows and four columns in the X direction and the Y direction. In the present embodiment, the second main pixel 202 is divided into six regions 202A in two rows and three columns in the X direction and the Y direction. Each of the regions 202A corresponds to twelve subpixels 104 in three rows and four columns in the X direction and the Y direction.

In the present embodiment, the three regions 202A adjacent in the X direction form one set 204A. The set 204A of regions 202A is arranged in a matrix in the X direction and the Y direction. Three light shields 300 are positioned within the set 204A of regions 202A, and the three light shields 300 form one set 302A. The three light shields 300 correspond to the switching elements 240 that connect to the pixel electrodes 250 arranged in each of the three regions 202A that form the set 204A of regions 202A.

In the present embodiment, the light shield 300 is arranged in a staggered manner one at a time and, in the region 202A, of the set 204A, positioned on the −X side (hereinafter referred to as "region 202A1"), the light shield 300 overlaps the red subpixel 104R and the green subpixel 104G positioned on the −X side in the first row. Additionally, in the region 202A, of the set 204A, positioned in the center (hereinafter referred to as "region 202A2"), the light shield 300 overlaps the green subpixel 104G and the blue subpixel 104B positioned on the −X side in the second row. Furthermore, in the region 202A, of the set 204A, positioned on the +X side (hereinafter referred to as "region 202A3"), the light shield 300 overlaps the blue subpixel 104B and the red subpixel 104R positioned on the −X side in the third row.

That is, the set 302A of light shields 300 of the present embodiment equally blocks, by one set and for each color, the light that is incident on the subpixels 104 corresponding to the set 204A of regions 202A. Specifically, the sum of the area where the light shield 300 positioned within the region 202A1 shields the red subpixel 104R and the area where the light shield 300 positioned within the region 202A3 shields the red subpixel 104R, the sum of the area where the light shield 300 positioned within the region 202A1 shields the green subpixel 104G and the area where the light shield 300 positioned within the region 202A2 shields the green subpixel 104G, and the sum of the area where the light shield 300 positioned within the region 202A2 shields the blue subpixel 104B and the area where the light shield 300 positioned within the region 202A3 shields the blue subpixel 104B are equal. Accordingly, when viewing as one unit of the set 204A in which the regions 202A are arranged in the X direction, subpixels 104 of specific colors are not periodically shielded. Since subpixels 104 of specific colors are not periodically shielded, the liquid crystal display device 10 can suppress color moire.

Furthermore, in the present embodiment as well, the six light shields 300 positioned within the second main pixel 202 equally shield, as a set of six and for each color, the subpixels 104. Accordingly, the liquid crystal display device 10 can further suppress color moire.

As described above, in the present embodiment as well, the liquid crystal display device 10 can suppress color moire. Furthermore, the pixel electrode 250 is provided in each region 202A and, as such, the liquid crystal display device 10 of the present embodiment can suppress the generation of dark spots that are easily visible to the observer.

Embodiment 7

In Embodiment 1, the scanning wires GL of the second liquid crystal display panel 200 extend linearly in the X direction, and the signal wires DL of the second liquid crystal display panel 200 extend linearly in the Y direction. However, a configuration is possible in which the scanning wires GL and the signal wires DL of the second liquid crystal display panel 200 are bent. Additionally, a configuration is possible in which the scanning wires GL and the signal wires DL of the second liquid crystal display panel 200 form a light blocking pattern.

As with the liquid crystal display device 10 of Embodiment 1, a liquid crystal display device 10 of the present embodiment includes a panel 50, a back light 400, and a display controller 500. The configurations of the first liquid crystal display panel 100, the switching elements 240 (the light shields 300) of the second liquid crystal display panel 200, and the like are the same as in Embodiment 1. Additionally, the arrangement of the light shield 300, and the overlapping of the light shield 300 and the subpixels 104 of the first liquid crystal display panel 100 are the same as in Embodiment 1. As such, next, the scanning wires GL and the signal wires DL of the second liquid crystal display panel 200, and the overlapping of the scanning wires GL and the signal wires DL (light blocking pattern) and the first main pixels 102 (the subpixels 104) of the first liquid crystal display panel 100 are described.

Figure 34:
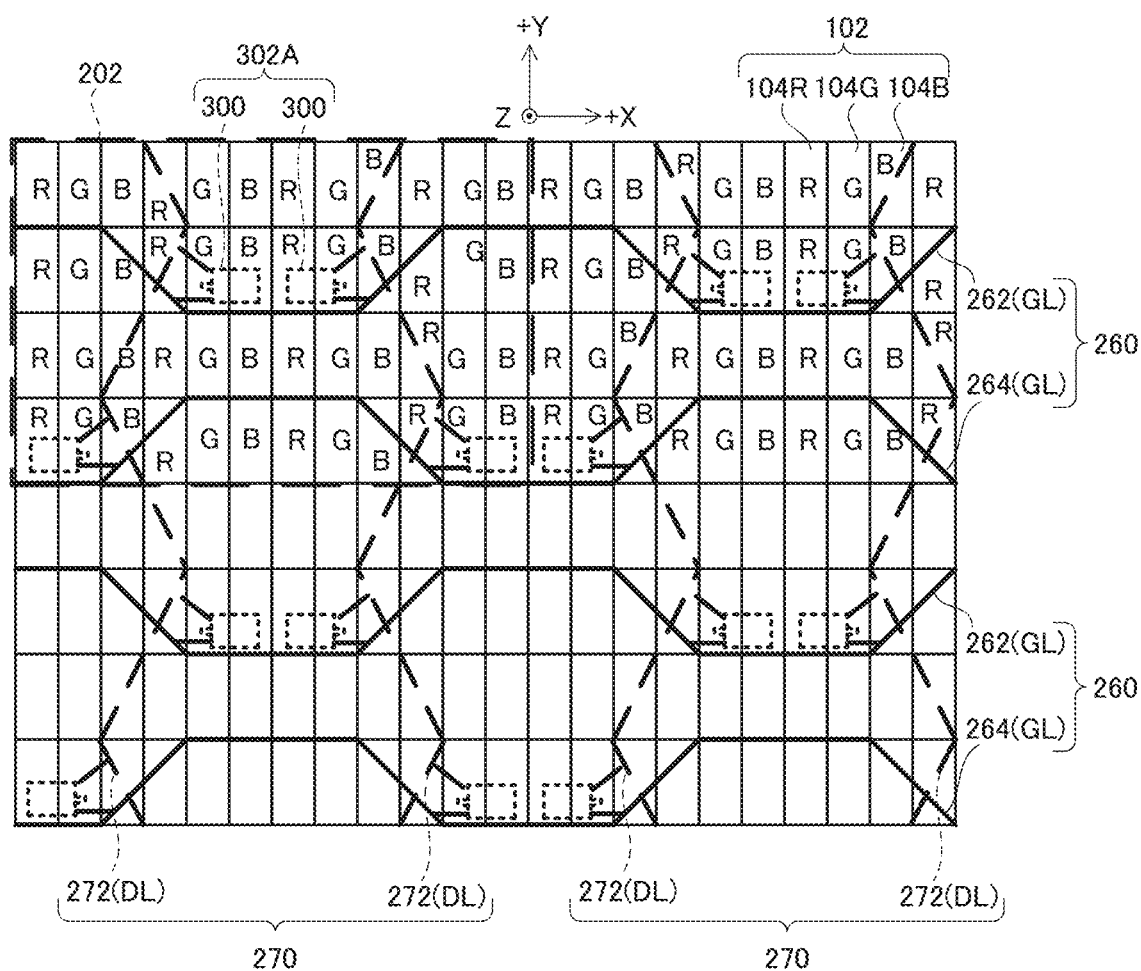
FIG. 34 is a drawing illustrating overlapping of a second main pixel and subpixels according to Embodiment 7.
Figure 35:
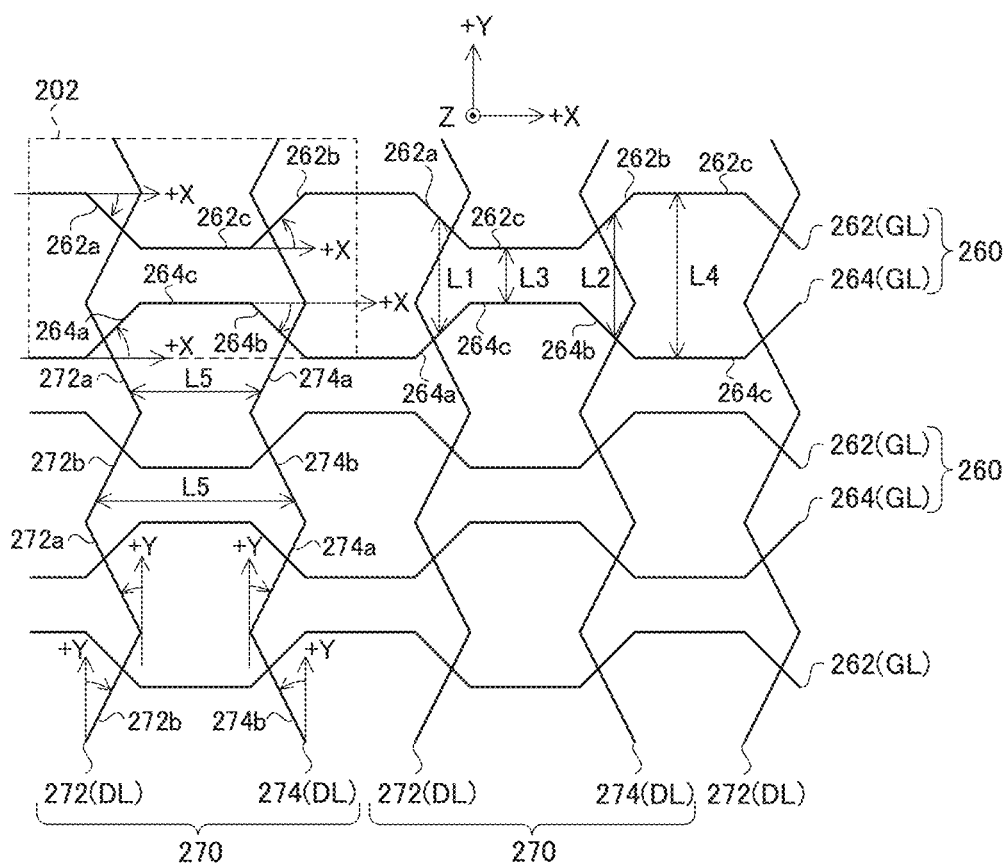
FIG. 35 is a drawing illustrating a first light blocking pattern and a second light blocking pattern according to Embodiment 7.

Firstly, the scanning wires GL are described. The scanning wires GL have light blocking properties, and are formed from a metal (aluminum (AL), molybdenum (Mo), or the like). As illustrated in FIGS. 34 and 35, the scanning wires GL extend in the X direction and are arranged in the Y direction. Additionally, a pair of adjacent scanning wires GL forms a light-blocking first light blocking pattern 260 that extends in the X direction. The first light blocking pattern 260 is repeatedly disposed in the Y direction and blocks the light that is emitted from the back light 400 and that is incident on the first main pixels 102 (the subpixels 104). Note that, to facilitate comprehension, the scanning wires GL are illustrated as solid lines and the signal wires DL are illustrated as dashed lines in FIG. 34.

As illustrated in FIG. 35, one scanning wire GL (hereinafter also referred to as "first light blocking wire 262") of the pair of adjacent scanning wires GL includes a first incline portion 262a, a second incline portion 262b, and a first flat portion 262c. The first incline portion 262a is inclined at an acute angle to the clockwise direction with respect to the +X direction, and the second incline portion 262b is inclined at an acute angle in the opposite direction of the first incline portion 262a (the counter-clockwise direction) with respect to the +X direction. The first flat portion 262c extends parallel to the X direction and connects the first incline portion 262a and the second incline portion 262b to each other.

The other scanning wire GL (hereinafter also referred to as "second light blocking wire 264") of the pair of adjacent scanning wires GL has line symmetry in the X direction with the one scanning wire GL (the first light blocking wire 262), and includes a third incline portion 264a, a fourth incline portion 264b, and a second flat portion 264c. The third incline portion 264a opposes the first incline portion 262a of the first light blocking wire 262, and is inclined at an acute angle in the counter clockwise direction with respect to the +X direction. The fourth incline portion 264b opposes the second incline portion 262b of the first light blocking wire 262, and is inclined at an acute angle in the opposite direction (the clockwise direction) to the third incline portion 264a with respect to the +X direction. The second flat portion 264c extends parallel to the X direction, opposes the first flat portion 262c of the first light blocking wire 262, and connects the third incline portion 264a and the fourth incline portion 264b to each other.

The first light blocking wire 262 includes the first incline portion 262a that is inclined at an acute angle in the clockwise direction with respect to the +X direction, and the second incline portion 262b that is inclined at an acute angle in the opposite direction to the first incline portion 262a with respect to the +X direction, and the first light blocking wire 262 and the second light blocking wire 264 adjacent to the first light blocking wire 262 have a relationship of line symmetry in the X direction. Accordingly, as illustrated in FIG. 35, the spacing between the first light blocking wire 262 and the second light blocking wire 264 changes continuously between the first incline portion 262a of the first light blocking wire 262 and the third incline portion 264a of the second light blocking wire 264 (spacing L1), and changes continuously between the second incline portion 262b of the first light blocking wire 262 and the fourth incline portion 264b of the second light blocking wire 264 (spacing L2). Furthermore, the spacing (spacing L3 and spacing L4) also changes between the first flat portion 262c of the first light blocking wire 262 and the second flat portion 264c of the second light blocking wire 264. Due to these configurations, even when the second liquid crystal display panel 200 is stacked on the first liquid crystal display panel 100, spatial frequency interference between the second liquid crystal display panel 200 and the first liquid crystal display panel 100 can be suppressed, and moire of the liquid crystal display device 10 can be suppressed. Note that it is preferable that the period of the first light blocking pattern 260 be a natural number multiple of the X direction width of the first main pixel 102.

Next, the signal wires DL are described. As with the scanning wires GL, the signal wires DL have light blocking properties, and are formed from a metal (aluminum (AL), molybdenum (Mo), or the like). As illustrated in FIGS. 34 and 35, the signal wires DL extend in the Y direction and are arranged in the X direction. Additionally, a pair of adjacent signal wires DL forms a light-blocking second light blocking pattern 270 that extends in the Y direction. The second light blocking pattern 270 is repeatedly disposed in the X direction and blocks the light that is emitted from the back light 400 and that is incident on the first main pixels 102 (the subpixels 104).

As illustrated in FIG. 35, one signal wire DL (hereinafter also referred to as "third light blocking wire 272") of the pair of adjacent signal wires DL includes a fifth incline portion 272a, and a sixth incline portion 272b. The fifth incline portion 272a is inclined at an acute angle in the counter clockwise direction with respect to the +Y direction. The sixth incline portion 272b is inclined at an acute angle in the opposite direction (the clockwise direction) to the fifth incline portion 272a with respect to the +Y direction.

The other signal wire DL (hereinafter also referred to as "fourth light blocking wire 274") of the pair of adjacent signal wires DL has line symmetry in the Y direction with the one signal wire DL (the third light blocking wire 272), and includes a seventh incline portion 274a and an eighth incline portion 274b. The seventh incline portion 274a opposes the fifth incline portion 272a of the third light blocking wire 272, and is inclined at an acute angle in the clockwise direction with respect to the +Y direction. The eighth incline portion 274b opposes the sixth incline portion 272b of the third light blocking wire 272, and is inclined at an acute angle in the opposite direction (the counter clockwise direction) to the seventh incline portion 274a with respect to the +Y direction. Note that the third light blocking wire 272 and the fourth light blocking wire 274 of the second light blocking pattern 270 respectively correspond to the first light blocking wire and the second light blocking wire of the light blocking pattern, and the fifth incline portion 272a and the sixth incline portion 272b of the third light blocking wire 272 respectively correspond to the first incline portion and the second incline portion of the first light blocking wire.

The third light blocking wire 272 includes the fifth incline portion 272a that is inclined at an acute angle in the counter clockwise direction with respect to the +Y direction, and the sixth incline portion 272b that is inclined at an acute angle in the opposite direction to the fifth incline portion 272a with respect to the +Y direction, and the third light blocking wire 272 and the fourth light blocking wire 274 adjacent to the third light blocking wire 272 have a relationship of line symmetry in the Y direction. Accordingly, as illustrated in FIG. 35, a spacing L5 between the third light blocking wire 272 and the fourth light blocking wire 274 continuously changes. Due to these configurations, even when the second liquid crystal display panel 200 is stacked on the first liquid crystal display panel 100, spatial frequency interference between the second liquid crystal display panel 200 and the first liquid crystal display panel 100 can be suppressed, and moire of the liquid crystal display device 10 can be suppressed. Note that it is preferable that the period of the second light blocking pattern 270 be a natural number multiple of the Y direction width of the subpixels 104.

Next, the overlapping of the first light blocking pattern 260 and the second light blocking pattern 270, and the first main pixels 102 (the subpixels 104) of the first liquid crystal display panel 100 is described. As illustrated in FIG. 34, in the first light blocking pattern 260 extending in the X direction, the first incline portion 262a and the second incline portion 262b of the first light blocking wire 262, and the third incline portion 264a and the fourth incline portion 264b of the second light blocking wire 264 incline across the subpixels 104 of a plurality of different colors (the red subpixel 104R and the blue subpixel 104B) of the first liquid crystal display panel 100. Due to this, the brightness of the subpixels 104 that overlap with the first light blocking pattern 260 slightly decreases, and the first main pixels 102 that include the subpixels 104 that overlap with the first light blocking pattern 260 present a color that slightly differs from the color intended to be displayed. However, subpixels 104 in which a brightness decrease of the same level occurs are positioned nearby and, as such, the brightness of the subpixels 104 is averaged to an observer that is observing the liquid crystal display device 10, and the observer recognizes, as the same brightness gradation, the brightness of the plurality of subpixels 104 for which the brightness is decreased. Accordingly, cases in which the observer recognizes color moire can be suppressed in the overall displaying of the liquid crystal display device 10.

In the second light blocking pattern 270 extending in the Y direction, the fifth incline portion 272a and the sixth incline portion 272b of the third light blocking wire 272, and the seventh incline portion 274a and the eighth incline portion 274b of the fourth light blocking wire 274 incline across the subpixels 104 of a plurality of different colors (the red subpixel 104R and the blue subpixel 104B) of the first liquid crystal display panel 100. Due to this, as with the first light blocking pattern 260, the first main pixels 102 that include the subpixels 104 that overlap with the second light blocking pattern 270 present a color that slightly differs from the color intended to be displayed. However, the color that the first main pixels 102 that include the subpixels 104 that overlap with the second light blocking pattern 270 and the color of the first main pixels 102 positioned near the first main pixels 102 that include the subpixels 104 that overlap with the second light blocking pattern 270 are recognized as different colors by the observer and the saturation of mixed colors also declines. As such, cases in which the observer recognizes color moire can be suppressed in the overall displaying of the liquid crystal display device 10.

As described above, the first light blocking pattern (the scanning wires GL) of the second liquid crystal display panel 200 is formed from the first light blocking wire 262 including the first incline portion 262a that is inclined with respect to the +X direction, the second incline portion 262b that is inclined in the opposite direction to the first incline portion 262a with respect to the +X direction, and the first flat portion 262c that connects the first incline portion 262a and the second incline portion 262b to each other, and the second light blocking wire 264 that has line symmetry in the X direction with the first light blocking wire 262. As such, spatial frequency interference between the first liquid crystal display panel 100 and the second liquid crystal display panel 200 can be suppressed, and moire of the liquid crystal display device 10 can be suppressed. Furthermore, the occurrence of color moire can be suppressed.

The second light blocking pattern (the signal wires DL) of the second liquid crystal display panel 200 is formed from the third light blocking wire 272 including the fifth incline portion 272a that is inclined at an acute angle with respect to the +Y direction and the sixth incline portion 272b that is inclined at an acute angle in the opposite direction to the fifth incline portion 272a with respect to the +Y direction, and the fourth light blocking wire 274 that has line symmetry in the Y direction with the third light blocking wire 272. As such, spatial frequency interference between the first liquid crystal display panel 100 and the second liquid crystal display panel 200 can be suppressed, and moire of the liquid crystal display device 10 can be suppressed. The occurrence of color moire can also be suppressed.

In the present embodiment, as in Embodiment 1, the set 302A of light shields 300 is arranged in a staggered manner in units of the set 302A, and the subpixels 104 arranged continuously in the X direction are equally shielded, for each color, by the set 302A of light shields 300. Accordingly, the liquid crystal display device 10 can suppress color moire. Furthermore, the four light shields 300 positioned within the second main pixel 202 equally shield, as a set of four and for each color, the subpixels 104 and, as such, the liquid crystal display device 10 can further suppress color moire.

Embodiment 8

It is sufficient that the plurality of light shields 300 positioned within the second main pixel 202 equally shield, with one set and for each color, the subpixels 104. With the exception of the overlapping of the light shield 300 and the subpixels 104 of the first liquid crystal display panel 100, the liquid crystal display device 10 of the present embodiment is the same as the liquid crystal display device 10 of Embodiment 2. As such, next, the overlapping of the light shield 300 and the subpixels 104 of the first liquid crystal display panel 100 are described.

Figure 36:
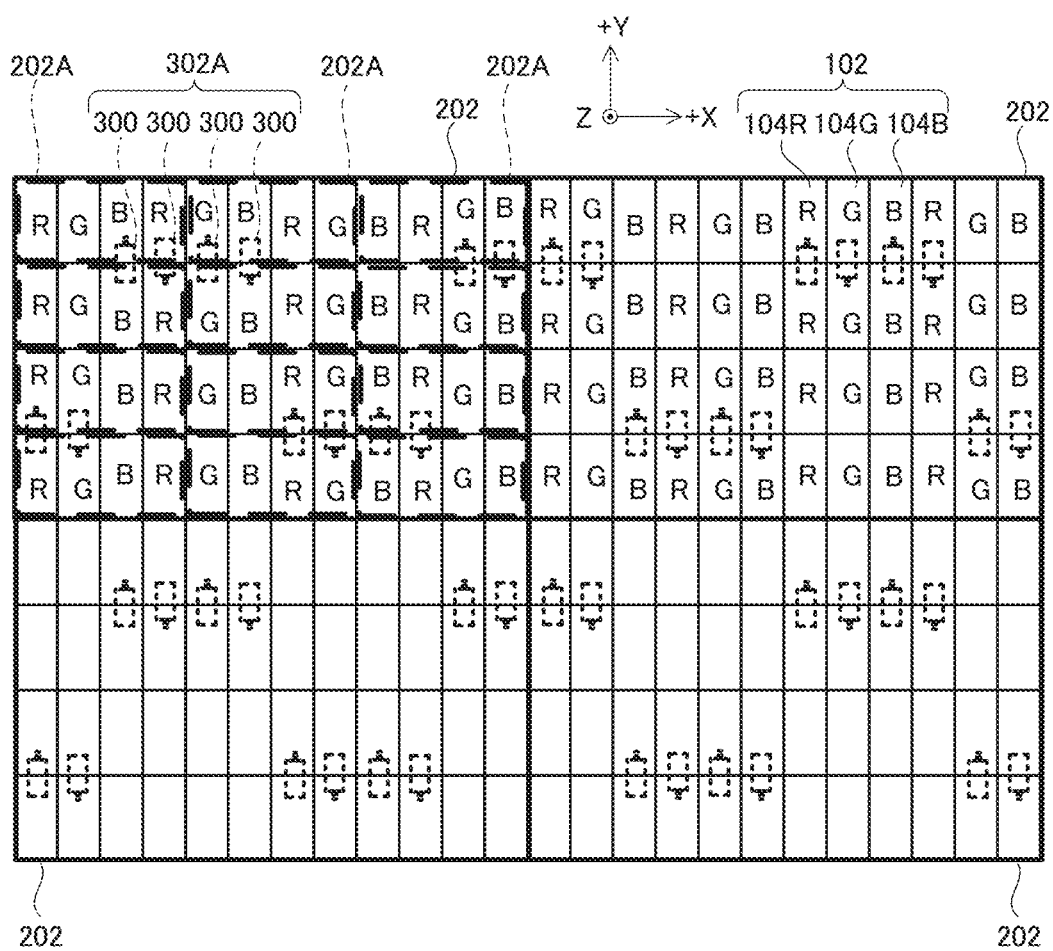
FIG. 36 is a drawing illustrating overlapping of second main pixels and subpixels according to Embodiment 8.
Figure 37:
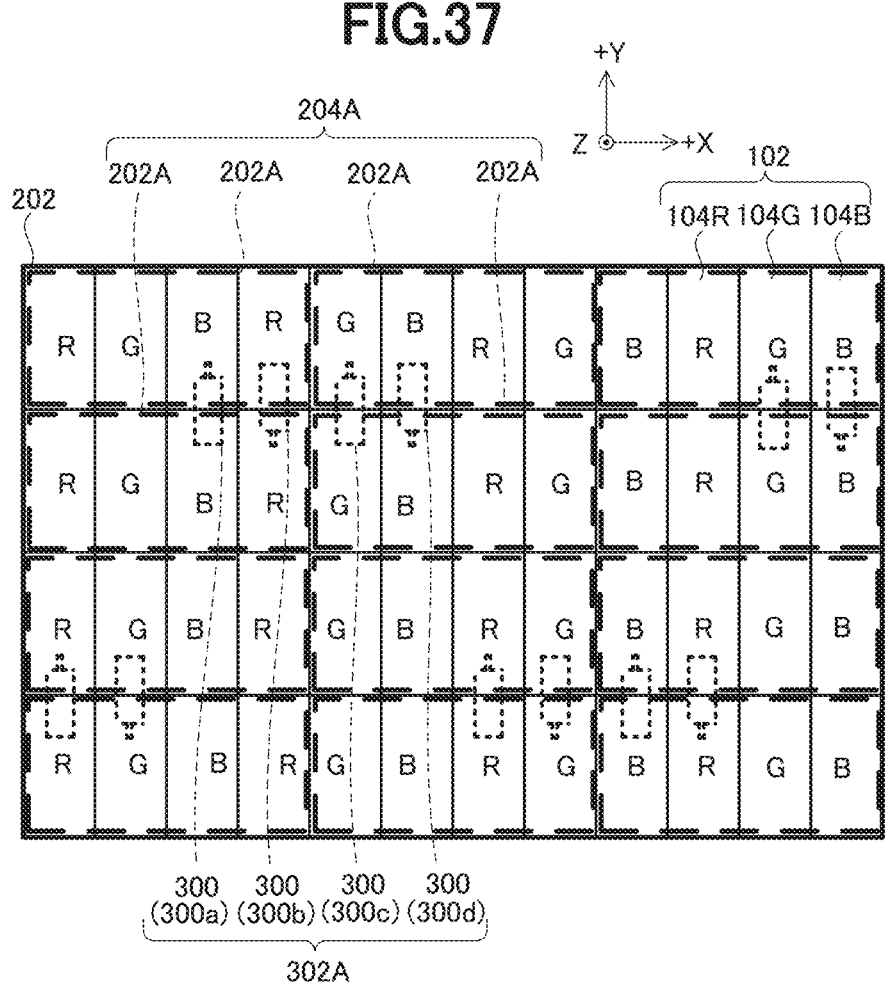
FIG. 37 is a drawing illustrating overlapping of a second main pixel and subpixels according to Embodiment 8.

In the present embodiment, as illustrated in FIGS. 36 and 37, the set 302A of light shields 300 is arranged in a staggered manner, and overlaps eight subpixels 104 in 2 rows and 4 columns in the X direction and the Y direction. Specifically, the set 302A of light shields 300 overlaps, in order from the −X side, two blue subpixels 104B, two red subpixels 104R, two green subpixels 104G, and two blue subpixels 104B. The set 302A of light shields 300 blocks the light that is emitted from the back light 400 and that is incident on these subpixels 104.

The light shield 300a straddles the two blue subpixels 104B arranged in the Y direction to block the light that is incident on these subpixels 104. The light shield 300b blocks the light that is incident on the two red subpixels 104R arranged in the Y direction. The light shield 300c blocks the light that is incident on the two green subpixels 104G arranged in the Y direction. The light shield 300d straddles the two blue subpixels 104B arranged in the Y direction to block the light that is incident on these subpixels 104. Accordingly, in the present embodiment, the set 302A of light shields 300 does not equally shield, for each color, the subpixels 104 arranged continuously in the X direction.

However, the 12 light shields 300 (FIG. 37) positioned within the second main pixel 202 equally shield, as a set of 12 and for each color, the subpixels 104. Due to this, when a shift occurs in the overlapping of the second liquid crystal display panel 200 and the first liquid crystal display panel 100, or when viewing the displaying of the liquid crystal display device 10 from the diagonal direction, the 12 light shields 300 can, as a set of 12, substantially equally shield, for each color, the subpixels 104 that are of different colors.

Figure 38:
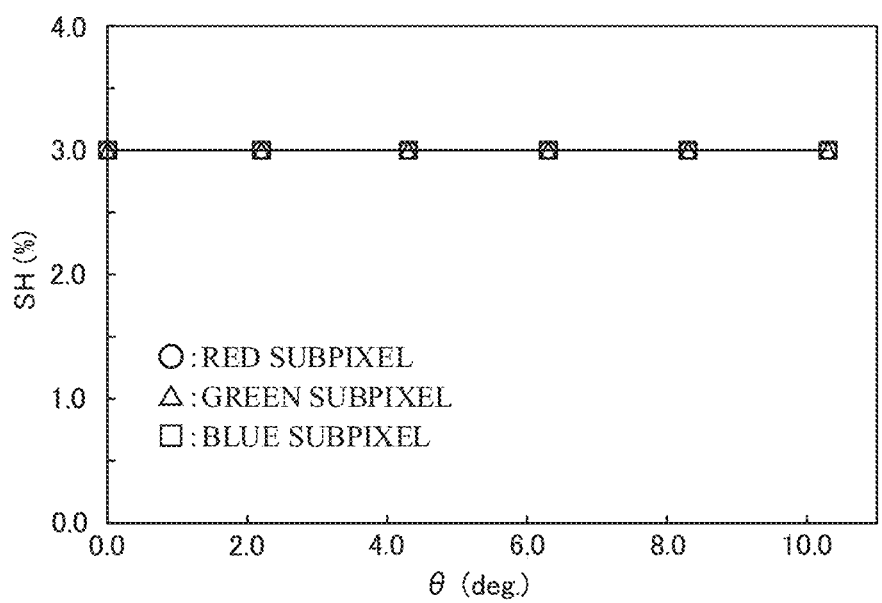
FIG. 38 is a drawing illustrating light shielding rates according to Embodiment 8.

Specifically, as illustrated in FIG. 38, in the present embodiment, the change of the light shielding rate SH relative to the angle θ of the viewing direction is small in the subpixels 104 of every color. Accordingly, when a shift occurs in the overlapping of the second liquid crystal display panel 200 and the first liquid crystal display panel 100, or when viewing the displaying of the liquid crystal display device 10 from the diagonal direction, the 12 light shields 300 can substantially equally shield, for each color, the subpixels 104 that are of different colors, and the liquid crystal display device 10 can suppress color moire.

As described above, the 12 light shields 300 positioned within the second main pixel 202 equally shield, as a set of 12 and for each color, the subpixels 104 and, as such, the liquid crystal display device 10 of the present embodiment can suppress color moire. Additionally, the pixel electrode 250 is provided in each region 202A and, as such, the liquid crystal display device 10 of the present embodiment can suppress the generation of dark spots that are easily visible to the observer.

Modified Examples

Embodiments have been described, but various modifications can be made to the present disclosure without departing from the spirit and scope of the present disclosure.

In the embodiments, the first liquid crystal display panel 100 and the second liquid crystal display panel 200 operate using the transverse electric field method. However, any operating method can be used for the first liquid crystal display panel 100 and the second liquid crystal display panel 200.

In the present embodiment, the first polarizing plate 132 of the first liquid crystal display panel 100 also serves as the polarizing plate on the light exit side of the second liquid crystal display panel 200. However, a configuration is possible in which the second liquid crystal display panel 200 includes a polarization plate on the main surface 220b of the second counter substrate 220.

In the present embodiment, each subpixel 104 of the first liquid crystal display panel 100 has a rectangular shape. However, the shape of the subpixels 104 may be determined as desired. A configuration is possible in which each subpixel 104 has a V shape. For example, a configuration is possible in which each subpixel 104 has a V shape when the subpixel 104 has a multi-domain structure.

A configuration is possible in which, when the pixel electrodes of the subpixels 104 are inclined with respect to the Y direction, the comb teeth of the pixel electrodes 250 of the second liquid crystal display panel 200 are inclined with respect to the Y direction in accordance with the incline of the pixel electrodes of the subpixels 104.

Figure 39:
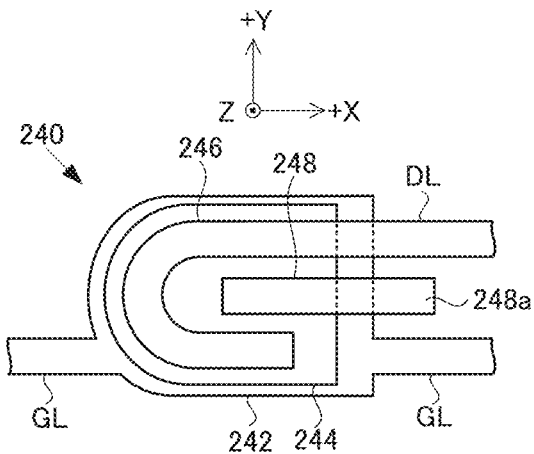
FIG. 39 is a plan view illustrating a switching element according to a modified example.
Figure 40:
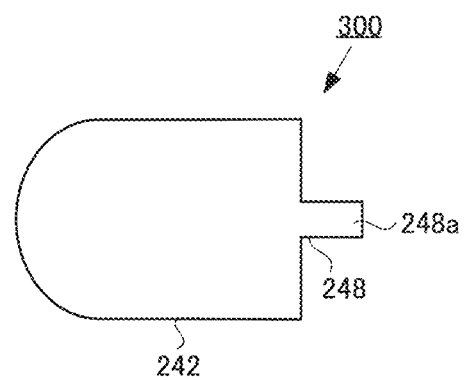
FIG. 40 is a plan view illustrating the external shape of a light shield according to a modified example.

As illustrated in FIG. 39, a configuration is possible in which each switching element 240 of the second liquid crystal display panel 200 includes a U-shaped source electrode 246. In such a case, the light shield 300 formed from each switching element 240 has the external shape illustrated in FIG. 40.

A configuration is possible in which each switching element 240 of the second liquid crystal display panel 200 includes a light blocking film that blocks external light or incident light from the back light. When the switching element 240 includes the light blocking film, the external shape of each light shield 300 formed from the switching element 240 is determined including the light blocking film. In the present specification the exterior shape of the light shield 300, 310 is determined by the configuration of the switching element 240.

In Embodiment 1, one light shield 300 overlaps subpixels 104 of two colors, and blocks the light incident on the subpixels 104 of two colors. In other embodiments, one light shield 300 or 310 overlaps subpixels 104 of one or two colors, and blocks the light incident on the subpixels 104 of one or two colors. However, a configuration is possible in which one light shield 300, 310 overlaps subpixels 104 of three colors, and blocks the light incident on the subpixels 104 of three colors.

In Embodiment 4, the dummy light shielding layer DM is formed on the main surface 210a of the second TFT substrate 210. However, the position at which the dummy light shielding layer DM is formed may be determined as desired. For example, a configuration is possible in which the dummy light shielding layer DM is formed on the second counter substrate 220.

In Embodiment 4, the light shield 300 and the light shield 310 of the set 302B are arranged in the order of, in the X direction, the light shield 300, the light shield 310, the light shield 310, and the light shield 300 (that is, the two light shields 300 sandwich the two light shields 310). However, a configuration is possible in which, in the set 302B, the light shield 300 and the light shield 310 are arranged in the order of, in the X direction, the light shield 300, the light shield 300, the light shield 310, and the light shield 310. Additionally, a configuration is possible in which the set 302B in which the light shield 300, the light shield 310, the light shield 310, and the light shield 300 are arranged in that order, and the set 302B in which the light shield 300, the light shield 300, the light shield 310, and the light shield 310 are arranged in that order are arranged in an alternating manner in the Y direction.

Figure 41:
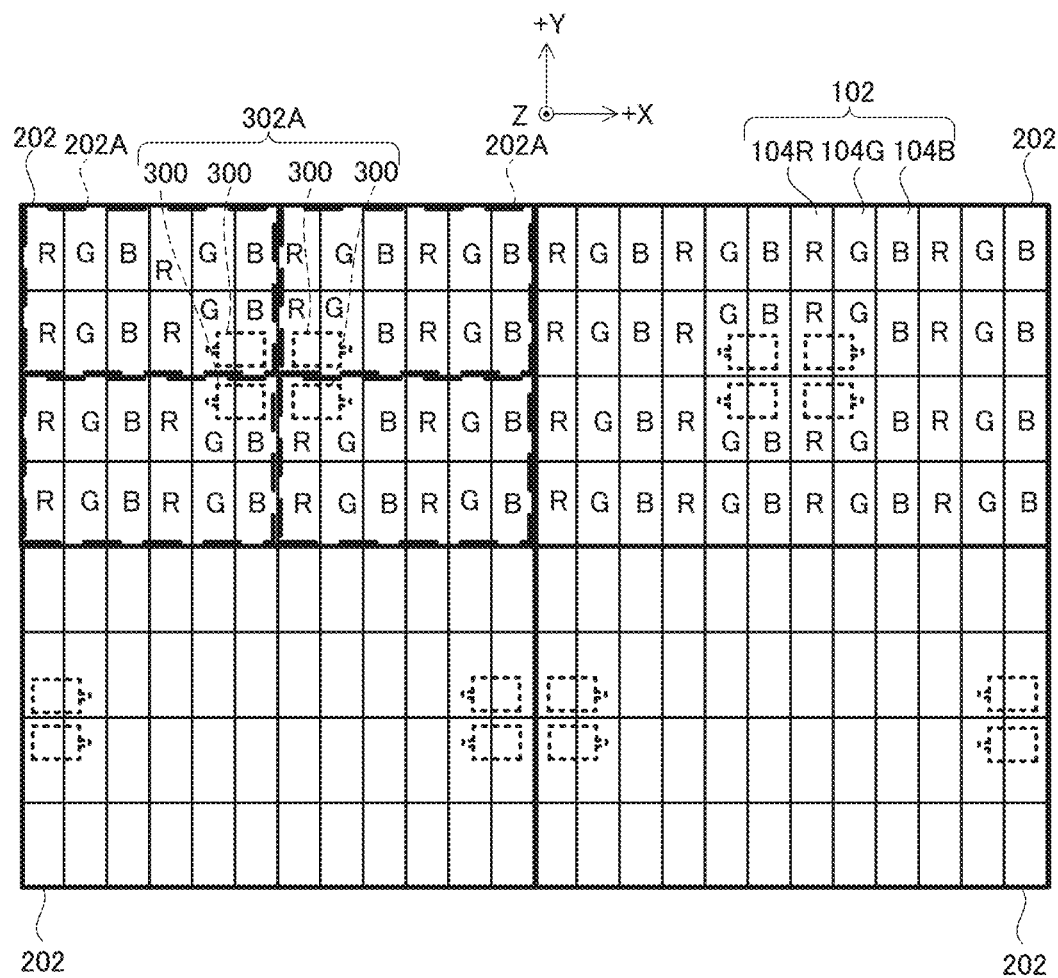
FIG. 41 is a drawing illustrating the arrangement of the light shield according to a modified example.
Figure 42:
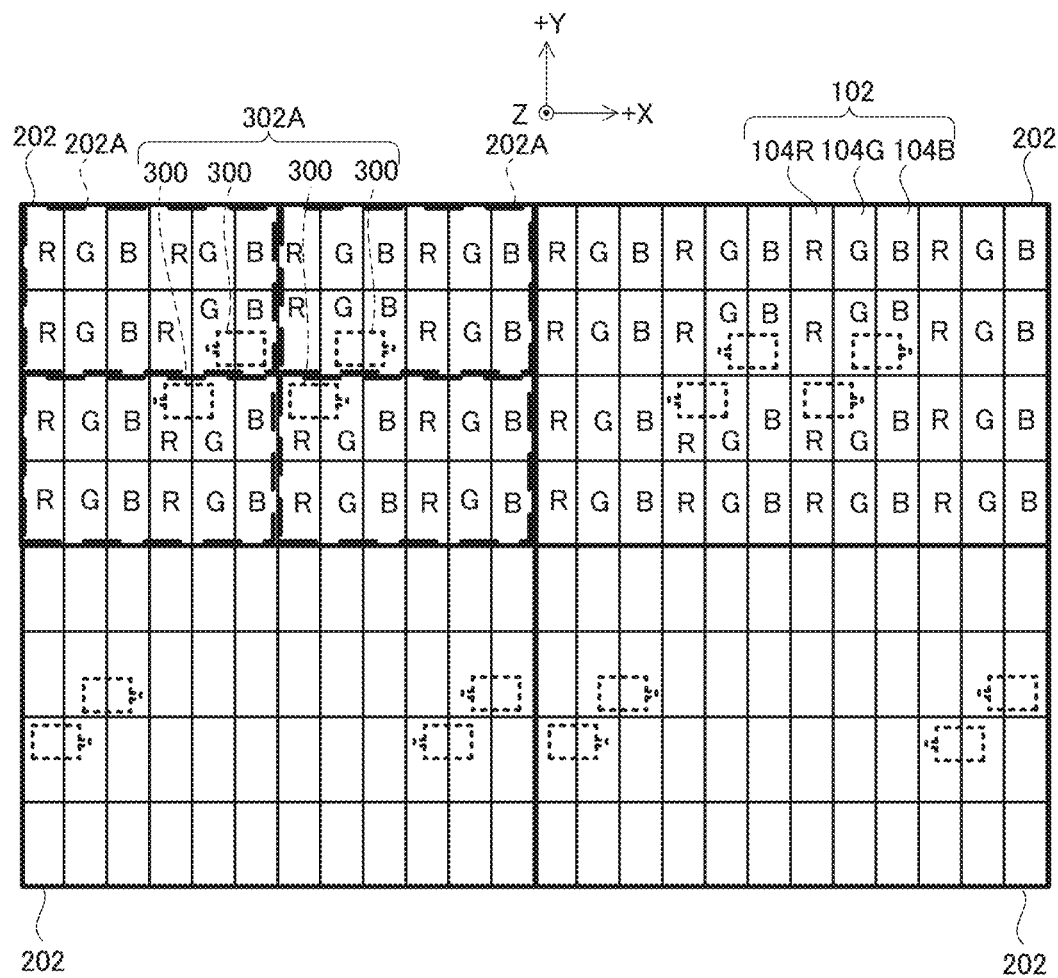
FIG. 42 is a drawing illustrating the arrangement of the light shield according to a modified example.

In Embodiments 1 to 4, 6, and 7, the two or four light shields 300, 310 forming the sets 302A, 302B are arranged in one row in the X direction. However, the arrangement of the light shields 300, 310 is not limited to one row (one column). For example, a configuration is possible in which the four light shields 300 that form the set 302A are, as illustrated in FIG. 41, arranged in two rows and two columns. Furthermore, as illustrated in FIG. 42, a configuration is possible in which the position of the light shield 300 is shifted between the first row and the second row.

The number of the first main pixels 102 of the first liquid crystal display panel 100 to which one second main pixel 202 of the second liquid crystal display panel 200 corresponds may be set as desired. Additionally, the number of divisions whereby one second main pixel 202 of the second liquid crystal display panel 200 is divided into the plurality of regions 202A may be set as desired. From the perspectives of resolution, complexity of wiring, suppressing the occurrence of dark spots, and the like, it is preferable that the size of the second main pixel 202 is approximately 500 μm×500 μm and the size of each region 202A is 250 μm×250 μm or less. Additionally, it is preferable that the number of divisions of each second main pixel 202 is from four to 16.

Figure 43:
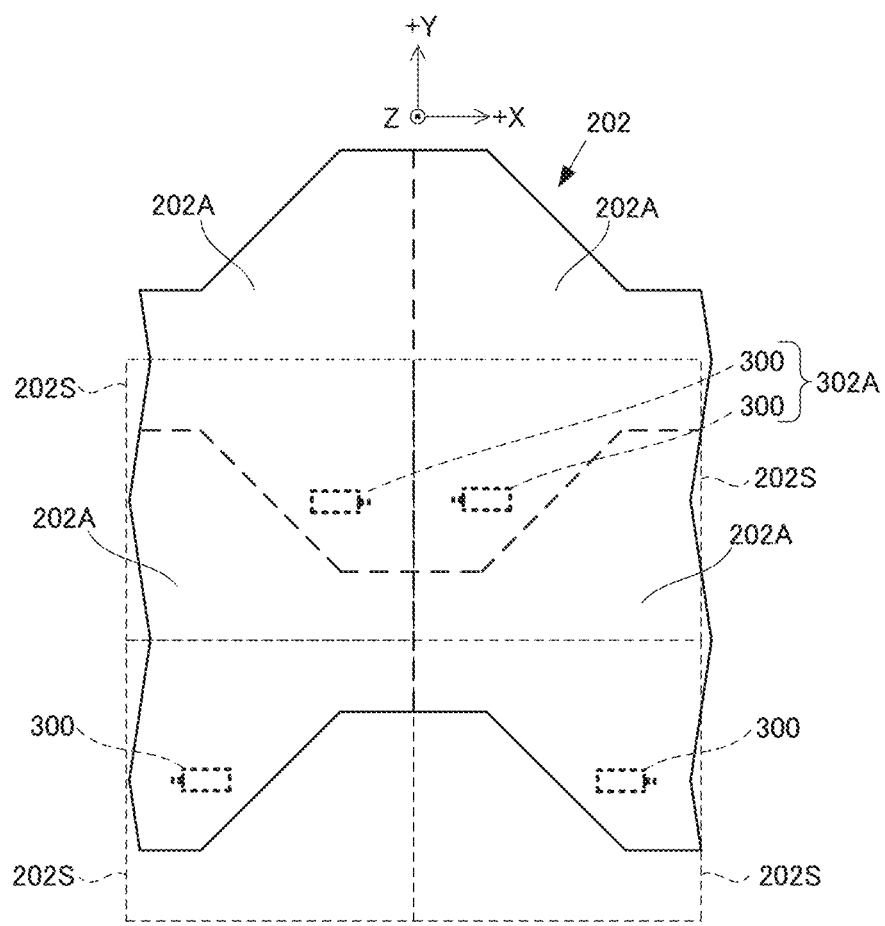
FIG. 43 is a drawing illustrating a second main pixel according to a modified example.

In the present embodiment, the second main pixel 202 of the second liquid crystal display panel 200 has a rectangular shape. However, the shape of the second main pixel 202 may be determined as desired. For example, as illustrated in FIG. 43, a configuration is possible in which the second main pixel 202 has a non-rectangular shape. In such a case, the light shield 300 can be arranged as in the embodiments by anticipating a virtual region 202S that has a rectangular shape.

Figure 44:
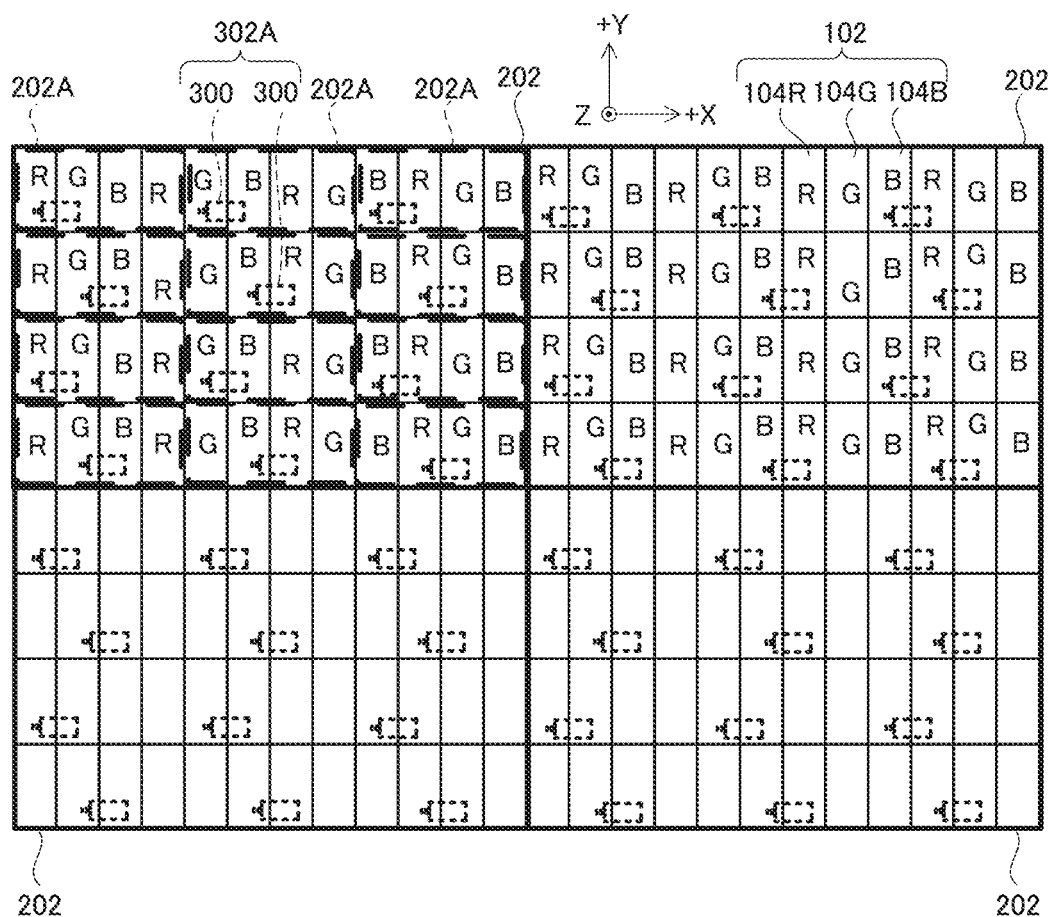
FIG. 44 is a drawing illustrating overlapping of second main pixels and subpixels according to a modified example.
Figure 45:
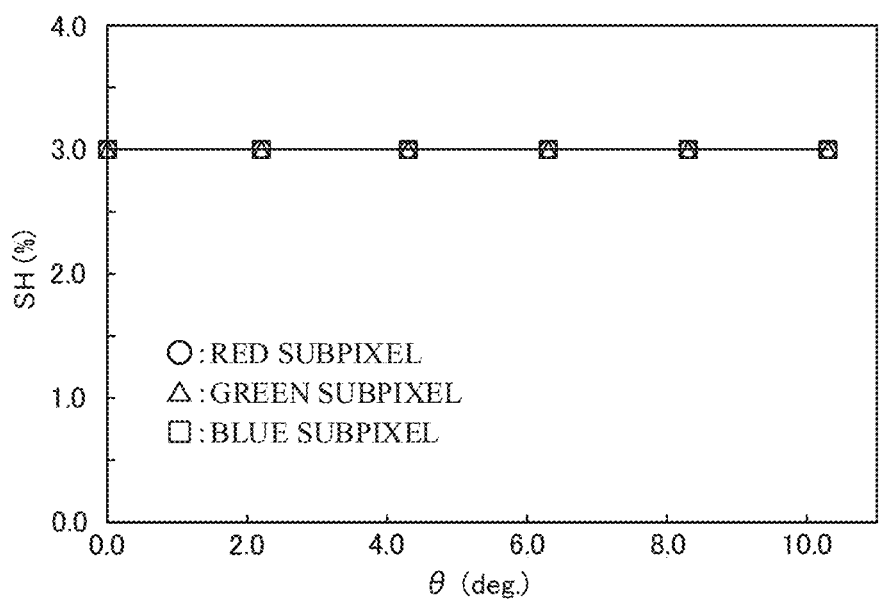
FIG. 45 is a drawing illustrating light shielding rates according to a modified example.

In Embodiment 5 in which the light shield 300 is arranged in a staggered manner one at a time, the second main pixel 202 of the second liquid crystal display panel 200 is divided into four regions 202A in two rows and two columns in the X direction and the Y direction. The number of divisions of the second main pixel 202 can be set as desired when arranging the light shield 300 one at a time in a staggered manner as well. For example, as illustrated in FIG. 44, a configuration is possible in which the second main pixel 202 is divided into 12 regions 202A, in four rows and three columns in the X direction and the Y direction. In such a case as well, the set 302A of light shields 300 equally shields, with one set and for each color, each subpixel 104 of the continuously arranged rows SL of subpixels 104 of the same color. In this modified example as well, as illustrated in FIG. 45, the change of the light shielding rate SH relative to the angle θ of the viewing direction is small. Accordingly, when a shift occurs in the overlapping of the second liquid crystal display panel 200 and the first liquid crystal display panel 100, or when viewing the displaying of the liquid crystal display device 10 from the diagonal direction, the light shield 300 of the second main pixel 202 can substantially equally shield, for each color, the subpixels 104 that are of different colors, and the liquid crystal display device 10 can suppress color moire.

In Embodiment 7, the second liquid crystal display panel 200 includes the first light blocking pattern 260 and the second light blocking pattern 270. However, it is sufficient that the second liquid crystal display panel 200 includes at least one of the first light blocking pattern 260 and the second light blocking pattern 270.

Additionally, the first light blocking wire 262 of the first light blocking pattern 260 includes the first flat portion 262c and the second light blocking wire 264 of the first light blocking pattern 260 includes the second flat portion 264c. However, a configuration is possible in which the first light blocking wire 262 does not include the first flat portion 262c and the second light blocking wire 264 does not include the second flat portion 264c. That is, a configuration is possible in which the first light blocking wire 262 and the second light blocking wire 264 have a relationship of line symmetry in the X direction, and each extend zig-zagging in the X direction.

Meanwhile, a configuration is possible in which the third light blocking wire 272 of the second light blocking pattern 270 includes a third flat portion that connects the fifth incline portion 272a and the sixth incline portion 272b to each other, and extends parallel to the Y direction. Additionally, a configuration is possible in which the fourth light blocking wire 274 of the second light blocking pattern 270 includes a fourth flat portion that connects the seventh incline portion 274a and the eighth incline portion 274b to each other, and extends parallel to the Y direction.

A configuration is possible in which the second liquid crystal display panel 200 of Embodiments 2 to 8 and the modified example includes at least one of the first light blocking pattern 260 and the second light blocking pattern 270.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A liquid crystal display device comprising:
a first liquid crystal display panel in which a first main pixel including a plurality of subpixels of different colors is arranged in a matrix in a predetermined first direction and a predetermined second direction perpendicular to the predetermined first direction, the first liquid crystal display panel displaying a color image; and
a second liquid crystal display panel that is positioned on a side, opposite a surface of an observer side, of the first liquid crystal display panel and overlaid on the first liquid crystal display panel, includes a second main pixel corresponding to a plurality of the first main pixel, the second liquid crystal display panel displaying a monochrome image, wherein
the second main pixel is divided into a plurality of regions, and has pixel electrodes disposed in the plurality of regions and a plurality of light shields,
at least a portion of the plurality of light shields is formed from a switching element that connects to each of the pixel electrodes,
the plurality of light shields is arranged in a staggered manner,
the light shields positioned within one set of the regions, formed from the regions adjacent to each other, forms one set of the light shields, and
the one set of light shields equally blocks, for each color, light incident on the subpixels.

2. The liquid crystal display device according to claim 1, wherein
the one set of light shields equally blocks, for each color, light incident on the subpixels that are arranged continuously, and
the plurality of light shields are arranged in a staggered manner in units of the one set of the light shields.

3. The liquid crystal display device according to claim 2, wherein the plurality of light shields positioned within the second main pixel equally blocks, for each color, light incident on the subpixels.

4. The liquid crystal display device according to claim 2, wherein
the regions form a first set from the regions arranged in two rows and two columns in the predetermined first direction and the predetermined second direction, and form a second set from two of the regions arranged in the predetermined second direction,
a first row in which the first set is arranged in the predetermined second direction, and a second row in which the second set is arranged in the predetermined second direction shifted, with respect to the first row, an amount corresponding to one of the regions, are arranged in an alternating manner in the predetermined first direction,
in the first set of the regions, the one set of light shields is formed by arranging, in the predetermined first direction, four of the light shields formed from the switching element, and
in the second set of the regions, the one set of light shields is formed by arranging, in the predetermined first direction, two of the light shields formed from the switching element and two of the light shields formed from a dummy light shielding layer.

5. The liquid crystal display device according to claim 2, wherein at least a portion of the plurality of light shields straddle a plurality of the subpixels of mutually different colors, and blocks light incident on the plurality of subpixels.

6. The liquid crystal display device according to claim 2, wherein
- the second liquid crystal display panel includes a light blocking pattern that is repeatedly arranged and that has light blocking properties,
- the light blocking pattern extends in the predetermined first direction or the predetermined second direction, and includes a first light blocking wire including a first incline portion inclined with respect to an extending direction and a second incline portion inclined in an opposite direction to the first incline portion with respect to the extending direction, and a second light blocking wire that is adjacent to the first light blocking wire and that has line symmetry in the extending direction with the first light blocking wire, and
- the first light blocking wire and the second light blocking wire are formed from one selected from scanning wires and signal wires of the second liquid crystal display panel.

* * * * *